United States Patent
Kim

(10) Patent No.: US 10,924,596 B2
(45) Date of Patent: *Feb. 16, 2021

(54) METHOD AND APPARATUS FOR PROVIDING EVENT OF PORTABLE DEVICE HAVING FLEXIBLE DISPLAY UNIT

(71) Applicant: SAMSUNG ELECTRONICS CO., LTD., Suwon-si (KR)

(72) Inventor: Donghyun Kim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/272,520

(22) Filed: Feb. 11, 2019

(65) Prior Publication Data
US 2019/0191022 A1      Jun. 20, 2019

Related U.S. Application Data

(63) Continuation of application No. 15/251,843, filed on Aug. 30, 2016, now Pat. No. 10,244,091, which is a
(Continued)

(30) Foreign Application Priority Data

Jan. 7, 2012      (KR) ............ 10-2012-0002968

(51) Int. Cl.
*H04M 1/02*      (2006.01)
*G06F 1/16*      (2006.01)
(Continued)

(52) U.S. Cl.
CPC .......... *H04M 1/0268* (2013.01); *G06F 1/165* (2013.01); *G06F 1/1626* (2013.01);
(Continued)

(58) Field of Classification Search
CPC ............ H04M 1/72583; H04M 19/048
(Continued)

(56) References Cited

U.S. PATENT DOCUMENTS 5,841,431 A    11/1998   Simmers
6,125,286 A    9/2000    Jahagirdar et al.
(Continued)

FOREIGN PATENT DOCUMENTS

CN    1202079 A    12/1998
CN    1246194 A    3/2000
(Continued)

OTHER PUBLICATIONS

Communication dated Apr. 28, 2019, issued by the State Intellectual Property Office of P.R. China in counterpart Chinese Application No. 201510671103.5.
(Continued)

*Primary Examiner* — Lee Nguyen
(74) *Attorney, Agent, or Firm* — Sughrue Mion, PLLC

(57) ABSTRACT

A portable terminal is provided for operation in a first mode in which information is provided on a first curved surface area or a second mode in which information is provided on a second curved surface area, and controlling the display to provide, in response to an occurrence of an event while in the first mode, information related to the event on the first curved surface area, and provide, in response to the occurrence of the event while in the second mode, information related to the event on the second curved surface area.

7 Claims, 15 Drawing Sheets

Related U.S. Application Data continuation of application No. 13/735,484, filed on Jan. 7, 2013, now Pat. No. 9,491,272.

(51) Int. Cl.

| | | |
|---|---|---|
| *H04M 1/22* | (2006.01) | |
| *H04M 1/57* | (2006.01) | |
| *H04M 19/04* | (2006.01) | |
| *H04M 3/42* | (2006.01) | |
| *H04W 4/12* | (2009.01) | |
| *H04W 68/00* | (2009.01) | |
| *H04W 68/02* | (2009.01) | |
| *G09G 3/20* | (2006.01) | |
| *G09G 5/14* | (2006.01) | |

(52) U.S. Cl.
CPC .......... *G06F 1/1652* (2013.01); *G06F 1/1694* (2013.01); *G09G 3/2092* (2013.01); *G09G 5/14* (2013.01); *H04M 1/0281* (2013.01); *H04M 1/22* (2013.01); *H04M 1/57* (2013.01); *H04M 3/42042* (2013.01); *H04M 19/04* (2013.01); *H04W 4/12* (2013.01); *H04W 68/00* (2013.01); *H04W 68/02* (2013.01); *H01H 2219/039* (2013.01); *H04M 2201/38* (2013.01); *H04M 2250/12* (2013.01)

(58) Field of Classification Search
USPC .................................. 455/566–567; 345/173
See application file for complete search history.

(56) References Cited

U.S. PATENT DOCUMENTS

| | | | |
|---|---|---|---|
| 6,304,763 | B1 | 10/2001 | Jahagirdar et al. |
| 6,726,106 | B1 | 4/2004 | Han et al. |
| 6,763,249 | B2 | 7/2004 | Shirai |
| 7,071,915 | B2 | 7/2006 | Liang et al. |
| 7,912,508 | B2 | 3/2011 | Lee et al. |
| 8,195,254 | B2 | 6/2012 | Oksman et al. |
| 8,225,229 | B2 | 7/2012 | Thorn et al. |
| 8,249,664 | B1 | 8/2012 | Bauer et al. |
| 8,260,363 | B2 | 9/2012 | Roberts et al. |
| 8,369,890 | B2 | 2/2013 | Nicolas |
| 8,416,148 | B1 | 4/2013 | Park |
| 8,421,825 | B2 | 4/2013 | Taniguchi et al. |
| 8,437,806 | B2 | 5/2013 | Kim |
| 8,502,788 | B2 | 8/2013 | Cho |
| 8,564,618 | B2 | 10/2013 | Ryu et al. |
| 8,610,155 | B2 | 12/2013 | Hatano et al. |
| 9,008,731 | B2 | 4/2015 | Yoo |
| 9,104,301 | B2 | 8/2015 | Kim et al. |
| 9,119,293 | B2 | 8/2015 | Mycroft et al. |
| 9,124,713 | B2 | 9/2015 | Park et al. |
| 9,300,772 | B2 | 3/2016 | Kim |
| 9,489,078 | B2 | 11/2016 | Seo et al. |
| 9,489,079 | B2 | 11/2016 | Seo et al. |
| 9,489,080 | B2 | 11/2016 | Seo et al. |
| 9,686,873 | B2 | 6/2017 | Mycroft et al. |
| 10,318,120 | B2 | 6/2019 | Kwak et al. |
| 10,459,625 | B2 | 10/2019 | Seo et al. |
| 10,534,531 | B2 | 1/2020 | Seo et al. |
| 2001/0016502 | A1 | 8/2001 | Shirai |
| 2005/0012760 | A1 | 1/2005 | Yamamoto |
| 2006/0197753 | A1 | 9/2006 | Hotelling |
| 2006/0238517 | A1 | 10/2006 | King et al. |
| 2007/0013719 | A1 | 1/2007 | Yamamoto |
| 2008/0074442 | A1 | 3/2008 | Taniguchi et al. |
| 2008/0088602 | A1 | 4/2008 | Hotelling |
| 2008/0111833 | A1 | 5/2008 | Thorn et al. |
| 2008/0129647 | A1 | 6/2008 | Canova |
| 2008/0146285 | A1 | 6/2008 | Lee et al. |
| 2008/0161060 | A1* | 7/2008 | Yoshida ................ G06F 1/1616 455/566 |
| 2009/0109187 | A1 | 4/2009 | Noma |
| 2009/0138736 | A1 | 5/2009 | Chin |
| 2009/0228820 | A1 | 9/2009 | Kim et al. |
| 2009/0262078 | A1 | 10/2009 | Pizzi |
| 2009/0312063 | A1 | 12/2009 | Soto |
| 2009/0318184 | A1 | 12/2009 | Azami et al. |
| 2010/0048194 | A1 | 2/2010 | Park et al. |
| 2010/0060548 | A1 | 3/2010 | Choi et al. |
| 2010/0066643 | A1 | 3/2010 | King et al. |
| 2010/0066698 | A1 | 3/2010 | Seo |
| 2010/0066751 | A1 | 3/2010 | Ryu et al. |
| 2010/0117975 | A1 | 5/2010 | Cho |
| 2010/0123160 | A1 | 5/2010 | Hatano et al. |
| 2010/0171753 | A1 | 7/2010 | Kwon |
| 2010/0181988 | A1 | 7/2010 | Hong et al. |
| 2010/0216514 | A1 | 8/2010 | Smoyer et al. |
| 2010/0227651 | A1 | 9/2010 | Kim |
| 2010/0298033 | A1 | 11/2010 | Lee |
| 2010/0299599 | A1 | 11/2010 | Shin et al. |
| 2010/0331054 | A1* | 12/2010 | Roberts ................ H04M 1/57 455/567 |
| 2011/0143815 | A1 | 1/2011 | Inami |
| 2011/0065479 | A1 | 3/2011 | Nader |
| 2011/0086680 | A1 | 4/2011 | Kim et al. |
| 2011/0128241 | A1* | 6/2011 | Kang ................ G06F 1/1643 345/173 |
| 2011/0151935 | A1 | 6/2011 | Oksman et al. |
| 2011/0209100 | A1 | 8/2011 | Hinckley et al. |
| 2011/0242592 | A1 | 10/2011 | Tamura |
| 2011/0261002 | A1 | 10/2011 | Verthein |
| 2011/0268218 | A1 | 11/2011 | Kang et al. |
| 2011/0321143 | A1 | 12/2011 | Angaluri et al. |
| 2012/0013557 | A1 | 1/2012 | Lee et al. |
| 2012/0066591 | A1 | 3/2012 | Hackwell |
| 2012/0071207 | A1 | 3/2012 | Yoo |
| 2012/0098639 | A1 | 4/2012 | Ijas |
| 2012/0170177 | A1 | 7/2012 | Pertuit et al. |
| 2012/0176322 | A1 | 7/2012 | Karmi et al. |
| 2012/0210349 | A1 | 8/2012 | Campana et al. |
| 2012/0212502 | A1 | 8/2012 | Lin et al. |
| 2012/0235900 | A1 | 9/2012 | Border et al. |
| 2012/0242599 | A1 | 9/2012 | Seo et al. |
| 2012/0272179 | A1 | 10/2012 | Stafford |
| 2012/0274575 | A1 | 11/2012 | Solomon et al. |
| 2012/0290960 | A1 | 11/2012 | Yeung |
| 2012/0299813 | A1 | 11/2012 | Kang et al. |
| 2012/0299845 | A1 | 11/2012 | Seo et al. |
| 2012/0299980 | A1 | 11/2012 | Fujikawa |
| 2012/0306782 | A1 | 12/2012 | Seo et al. |
| 2013/0033434 | A1 | 2/2013 | Richardson et al. |
| 2013/0076649 | A1 | 3/2013 | Myers et al. |
| 2013/0086522 | A1 | 4/2013 | Shimazu et al. |
| 2013/0107433 | A1 | 5/2013 | Mycroft et al. |
| 2013/0145311 | A1 | 6/2013 | Joo |
| 2013/0300697 | A1 | 11/2013 | Kim et al. |
| 2013/0321340 | A1 | 12/2013 | Seo et al. |
| 2013/0342483 | A1 | 12/2013 | Seo et al. |
| 2014/0055345 | A1 | 2/2014 | Seo et al. |
| 2014/0055375 | A1 | 2/2014 | Kim et al. |
| 2014/0098028 | A1 | 4/2014 | Kwak et al. |
| 2014/0099999 | A1 | 4/2014 | Hatano et al. |
| 2014/0101560 | A1 | 4/2014 | Kwak et al. |
| 2014/0101576 | A1 | 4/2014 | Kwak et al. |
| 2014/0101578 | A1 | 4/2014 | Kwak et al. |
| 2014/0101579 | A1 | 4/2014 | Kim et al. |
| 2014/0152576 | A1 | 6/2014 | Kim et al. |
| 2014/0181700 | A1 | 6/2014 | Kim et al. |
| 2014/0184471 | A1 | 7/2014 | Martynov et al. |
| 2015/0015511 | A1 | 1/2015 | Kwak et al. |
| 2015/0015512 | A1 | 1/2015 | Kwak et al. |
| 2015/0017956 | A1 | 1/2015 | Jeong |
| 2015/0103014 | A1 | 4/2015 | Kim et al. |
| 2015/0116269 | A1 | 4/2015 | Kim et al. |
| 2015/0153895 | A1 | 6/2015 | Hotelling |
| 2015/0286358 | A1 | 10/2015 | Kim et al. |
| 2015/0296635 | A1 | 10/2015 | Mycroft et al. |
| 2015/0309691 | A1 | 10/2015 | Seo et al. |
| 2015/0319282 | A1 | 11/2015 | Park et al. |
| 2015/0378503 | A1 | 12/2015 | Seo et al. |

(56) References Cited

U.S. PATENT DOCUMENTS

| | | |
|---|---|---|
| 2016/0070399 A1 | 3/2016 | Hotelling |
| 2016/0269622 A1 | 9/2016 | Melnyk et al. |
| 2017/0012090 A1 | 1/2017 | Hatano et al. |
| 2017/0012091 A1 | 1/2017 | Hatano et al. |
| 2017/0052698 A1 | 2/2017 | Seo et al. |
| 2019/0272091 A1 | 9/2019 | Seo et al. |

FOREIGN PATENT DOCUMENTS

| | | |
|---|---|---|
| CN | 1310541 A | 8/2001 |
| CN | 1741542 A | 3/2006 |
| CN | 1761314 A | 4/2006 |
| CN | 101150610 A | 3/2008 |
| CN | 101308440 A | 11/2008 |
| CN | 101424990 A | 5/2009 |
| CN | 101432677 A | 5/2009 |
| CN | 101473634 A | 7/2009 |
| CN | 101493723 A | 7/2009 |
| CN | 101527745 A | 9/2009 |
| CN | 101536077 A | 9/2009 |
| CN | 101610298 A | 12/2009 |
| CN | 101644991 A | 2/2010 |
| CN | 201409149 Y | 2/2010 |
| CN | 101674410 A | 3/2010 |
| CN | 101676853 A | 3/2010 |
| CN | 101710917 A | 5/2010 |
| CN | 101739171 A | 6/2010 |
| CN | 101763190 A | 6/2010 |
| CN | 101771734 A | 7/2010 |
| CN | 101816027 A | 8/2010 |
| CN | 101827169 A | 9/2010 |
| CN | 101952787 A | 1/2011 |
| CN | 101957653 A | 1/2011 |
| CN | 101980136 A | 2/2011 |
| CN | 102215334 A | 10/2011 |
| CN | 102598109 A | 7/2012 |
| CN | 102668522 A | 9/2012 |
| DE | 202012011107 U1 | 2/2013 |
| EP | 1 220 515 A2 | 7/2002 |
| EP | 1 302 745 A1 | 4/2003 |
| EP | 2065783 A1 | 6/2009 |
| EP | 2 187 443 A2 | 5/2010 |
| EP | 2202619 A1 | 6/2010 |
| EP | 2 530 510 A2 | 12/2012 |
| EP | 2 568 373 A2 | 3/2013 |
| EP | 2631754 A1 | 8/2013 |
| JP | 2-195425 A | 8/1990 |
| JP | 11-17579 A | 1/1999 |
| JP | 1174953 A | 3/1999 |
| JP | 2001-86205 A | 3/2001 |
| JP | 2001-519585 A | 10/2001 |
| JP | 2003-298703 A | 10/2003 |
| JP | 2003-338768 A | 11/2003 |
| JP | 2005-38263 A | 2/2005 |
| JP | 2008-35429 A | 2/2008 |
| JP | 2010-86081 A | 4/2010 |
| JP | 2010-153813 A | 7/2010 |
| JP | 2010183532 A | 8/2010 |
| JP | 2010193494 A | 9/2010 |
| KR | 10-2008-0035709 A | 4/2008 |
| KR | 10-2010-0027502 A | 3/2010 |
| KR | 1020100052227 A | 5/2010 |
| KR | 10-2011-0112943 A | 10/2011 |
| KR | 10-2012-0092036 A | 8/2012 |
| KR | 1020120092037 A | 8/2012 |
| KR | 10-2012-0101508 A | 9/2012 |
| KR | 10-2013-0000392 A | 1/2013 |
| WO | 9918590 A1 | 4/1999 |
| WO | 2009/075035 A1 | 6/2009 |
| WO | 2011/076980 A1 | 6/2011 |
| WO | 2011/114190 A1 | 9/2011 |
| WO | 2012078079 A2 | 6/2012 |
| WO | 2013103278 A1 | 7/2013 |

OTHER PUBLICATIONS

Communication dated May 7, 2019, issued by the State Intellectual Property Office of P.R. China in counterpart Chinese Application No. 201510783372.0.
Communication dated May 13, 2019, issued by the State Intellectual Property Office of P.R. China in counterpart Chinese Application No. 201610628473.5.
Communication dated Jul. 2, 2019 issued by the Japanese Patent Office in counterpart Japanese Application No. 2018-118264.
International Search Report dated Apr. 30, 2013 issued by the International Searching Authority in counterpart International Application No. PCT/KR2013/000102 (PCT/ISA/210).
Communication dated Apr. 17, 2015 issued by the Korean Intellectual Property Office in counterpart Korean Application No. 10-2015-0012130.
Communication dated May 22, 2015 issued by the State Intellectual Property Office of the People's Republic of China in counterpart Chinese Patent Application No. 201380013096.9.
Communication dated Jun. 18, 2015 issued by the European Patent Office in counterpart European Patent Application No. 13733652.5.
Flexible display 'YOUM' at CES; Youtube Video; Published Jan. 11, 2013; 20 pgs.
Search Report dated Nov. 12, 2014 issued by International Searching Authority in Application No. PCT/KR2014/006273 (PCT/ISA/210).
Written Opinion dated Nov. 12, 2014 issued by International Searching Authority in Application No. PCT/KR2014/006273 (PCT/ISA/237).
Search Report dated Nov. 5, 2014 issued by International Searching Authority in Application No. PCT/KR2014/006214 (PCT/ISA/210).
Written Opinion dated Nov. 5, 2014 issued by International Searching Authority in Application No. PCT/KR2014/006214 (PCT/ISA/237).
Search Report dated Nov. 6, 2014 issued by International Searching Authority in Application No. PCT/KR2014/006275 (PCT/ISA/210).
Written Opinion dated Nov. 6, 2014 issued by International Searching Authority in Application No. PCT/KR2014/006275 (PCT/ISA/237).
Communication dated Jan. 23, 2015 issued by Korean Intellectual Property Office in Application No. 10-2014-0017331.
Communication dated Apr. 17, 2015 issued by Korean Intellectual Property Office in Application No. 10-2013-0143298.
Communication dated Apr. 17, 2015 issued by Korean Intellectual Property Office in Application No. 10-2013-0143301.
Communication dated Apr. 17, 2015 issued by Korean Intellectual Property Office in Application No. 10-2015-0012195.
Non-Final OA dated Jul. 8, 2015 issued by USPTO in U.S. Appl. No. 14/329,310.
Non-Final OA dated Nov. 10, 2015 issued by USPTO in U.S. Appl. No. 14/860,351.
Non-Final OA dated Jun. 23, 2015 issued by USPTO in U.S. Appl. No. 14/709,926.
Communication dated Aug. 25, 2015 issued by Korean Intellectual Property Office in Application No. 10-2014-0017331.
USPTO Office Action dated Nov. 18, 2015 issued in co-pending U.S. Appl. No. 14/860,383.
USPTO Office Action dated Nov. 20, 2015 issued in co-pending U.S. Appl. No. 14/821,523.
USPTO Office Action dated Dec. 3, 2015 issued in co-pending U.S. Appl. No. 14/329,310.
USPTO Office Action dated Jan. 4, 2016 issued in co-pending U.S. Appl. No. 14/860,436.
Communication dated Jan. 26, 2016 issued by the State Intellectual Property Office of P.R. China in counterpart Chinese Application No. 201380013096.9.
Office Action dated Feb. 26, 2016, issued by the United States Patent and Trademark Office in U.S. Appl. No. 14/329,310.
Communication dated Mar. 3, 2016, issued by the European Patent Office in counterpart European Application No. 13733652.5.
Notice of Allowance dated Mar. 15, 2016, issued by the United States Patent and Trademark Office in U.S. Appl. No. 14/821,509.

(56) References Cited

OTHER PUBLICATIONS

Office Action dated Apr. 1, 2016, issued by the United States Patent and Trademark Office in U.S. Appl. No. 14/860,351.
Communication dated Apr. 4, 2016, issued by the European Patent Office in counterpart European Application No. 16155833.3.
Communication dated Apr. 5, 2016, issued by the European Patent Office in counterpart European Application No. 16155952.1.
Communication dated Jun. 15, 2016 issued by European Patent Office in counterpart European Application No. 16167682.0.
Communication dated Jun. 30, 2016 issued by Chinese Intellectual Property Office in counterpart Chinese Application No. 201510670163.5.
Communication dated Aug. 11, 2016 issued by United States Patent and Trademark Office in counterpart U.S. Appl. No. 15/185,808.
Office Action dated Aug. 29, 2016, issued by the United States Patent and Trademark Office in U.S. Appl. No. 14/329,310.
Communication dated Aug. 30, 2016, issued by the State Intellectual Property Office of P.R. China in counterpart Chinese Application No. 201380013096.9.
Communication dated Aug. 31, 2016, issued by the Korean Intellectual Property Office in counterpart Korean Application No. 10-2015-0099693.
Office Action dated Sep. 7, 2016, issued by the United States Patent and Trademark Office in U.S. Appl. No. 15/185,716.
Communication dated Sep. 19, 2016, issued by the European Patent Office in counterpart European Application No. 16164994.2.
Communication dated Sep. 21, 2016, issued by the European Patent Office in counterpart European Application No. 14823080.8.
Summons to attend oral proceedings dated Oct. 18, 2016, issued by the European Patent Office in counterpart European Application No. 13733652.5.
Communication dated Oct. 19, 2016, issued by the Australian Patent Office in counterpart Australian Application No. 2014287943.
Communication dated Oct. 20, 2016, issued by the European Patent Office in counterpart European Application No. 16155833.3.
Communication dated Oct. 28, 2016, issued by the State Intellectual Property Office of P.R. China in counterpart Chinese Patent Application No. 201510670163.5.
Office Action dated Dec. 8, 2016 issued by the United States Patent and Trademark Office, in U.S. Appl. No. 14/329,179.
Office Action dated Dec. 8, 2016 issued by the United States Patent and Trademark Office, in U.S. Appl. No. 14/328,333.
Office Action dated Dec. 21, 2016 issued by United States Patent and Trademark Office, in U.S. Appl. No. 15/185,808.
Office Action dated Feb. 6, 2017 issued by the United States Patent and Trademark Office, in U.S. Appl. No. 14/329,310.
Communication dated Jan. 22, 2017, issued by the State Intellectual Property Office of People's Republic of China in counterpart Application No. 201610020779.2.
Communication dated Feb. 14, 2017, issued by the Australian Patent Office in counterpart Australian Application No. 2014287943.
Communication dated Feb. 4, 2017, issued by the State Intellectual Property Office of People's Republic of China in counterpart Application No. 201610020950.X.
Communication dated Dec. 13, 2016, issued by the Japanese Patent Office in counterpart Application No. 2014-551195.
Communication dated Feb. 22, 2017, issued by the European Patent Office in counterpart European Application No. 14822315.9.
Office Action dated Mar. 7, 2017, issued by the United States Patent and Trademark Office in U.S. Appl. No. 15/185,716.
Office Action dated Apr. 12, 2017, issued by the United States Patent and Trademark Office in counterpart U.S. Appl. No. 15/185,808.
Communication dated Mar. 29, 2017, issued by the Korean Intellectual Property Office in counterpart Korean Application No. 10-2016-0007712.
Communication dated Mar. 6, 2017, issued by the European Patent Office in counterpart European Application No. 14823060.0.
Communication dated Feb. 20, 2017, issued by the State Intellectual Property Office of P.R. China in counterpart Chinese Application No. 201480003845.4.
Communication dated Apr. 10, 2017, issued by the State Intellectual Property Office of P.R. China in counterpart Chinese Application No. 201380013096.9.
Communication dated Apr. 24, 2017 by the State Intellectual Property Office of P.R. China in counterpart Chinese Patent Application No. 201510670163.5.
Communication dated May 4, 2017 by the State Intellectual Property Office of P.R. China in counterpart Chinese Application No. 201610020779.2.
Communication dated May 4, 2017 by the State Intellectual Property Office of P.R. China in counterpart Chinese Application No. 201610280519.9.
Communication dated May 22, 2017 by the European Patent Office in counterpart European Application No. 16164994.2.
Communication dated Jul. 20, 2017 by the European Patent Office in counterpart European Application No. 17171078.3.
Communication dated Jun. 28, 2017 by the Korean Intellectual Property Office in counterpart Korean Application No. 10-2016-0107825.
Communication dated Jul. 4, 2017 by the State Intellectual Property Office of P.R. China in counterpart Chinese Application No. 201610020948.2.
Communication dated Jul. 19, 2017 by the Korean Intellectual Property Office in counterpart Korean Application No. 10-2017-0052301.
Office Action dated Jun. 8, 2017 by the United States Patent and Trademark Office in U.S. Appl. No. 14/329,179.
Office Action dated Jul. 12, 2017 by the United States Patent and Trademark Office in U.S. Appl. No. 14/329,310.
Communication dated Aug. 10, 2017, by the State Intellectual Property Office of People's Republic of China in counterpart Chinese Application No. 201610020950.X.
Communication dated Jul. 19, 2017, by the European Patent Office in counterpart European Application No. 16155952.1.
Communication dated Aug. 7, 2017, by the European Patent Office in counterpart European Application No. 17171077.5.
Communication dated Sep. 25, 2017, by the State Intellectual Property Office of People's Republic of China in counterpart Application No. 201510474027.9.
Communication dated Jul. 31, 2017, by the European Patent Office in counterpart European Application No. 17171083.3.
Communication dated Sep. 4, 2017, by the State Intellectual Property Office of People's Republic of China in counterpart Application No. 201610280519.9.
Communication dated Aug. 29, 2017, by the Japanese Patent Office in counterpart Japanese Application No. 2014-551195.
"REGZA Phone T-01C Instruction manual", NTT Docomo, Oct. 2011, 3.1 Ed. p. 28, 7 pages total (including English translation), Retrieved on Aug. 18, 2017, URL: https://www.nttdocomo.co.jp/binary/pdf/support/trouble/manual/download/T-01C_J_All.pdf.
Office Action dated Aug. 1, 2017 by the USPTO in U.S. Appl. No. 15/185,716.
Office Action dated Sep. 15, 2017 by the USPTO in U.S. Appl. No. 15/185,808.
Communication dated Oct. 19, 2017 by the State Intellectual Property Office of People's Republic of China in counterpart Chinese Application No. 201510783629.2.
Communication dated Nov. 1, 2017 by the State Intellectual Property Office of People's Republic of China in counterpart Chinese Application No. 201510670159.9.
Communication dated Nov. 6, 2017 by the State Intellectual Property Office of People's Republic of China in counterpart Chinese Application No. 201480003845.4.
Communication dated Nov. 16, 2017 by the State Intellectual Property Office of People's Republic of China in counterpart Chinese Application No. 201610020779.2.
Communication dated Dec. 20, 2017 by the European Patent Office in counterpart European Application No. 16164994.2.
Communication dated Dec. 4, 2017 by the State Intellectual Property Office of People's Republic of China in counterpart Chinese Application No. 201610020948.2.
Office Action dated Nov. 30, 2017 by the United States Patent and Trademark Office in U.S. Appl. No. 14/329,179.

(56) References Cited

OTHER PUBLICATIONS

Communication dated Jan. 10, 2018, issued by the State Intellectual Property Office of the People's Republic of China in counterpart Chinese Patent Application No. 201610020950.X.
Communication dated Feb. 2, 2018, issued by the State Intellectual Property Office of the People's Republic of China in counterpart Chinese Patent Application No. 201480049835.4.
Communication dated Feb. 8, 2018, issued by the State Intellectual Property Office of the People's Republic of China in counterpart Chinese Patent Application No. 201380013096.9.
Communication dated Apr. 2, 2018, issued by the State Intellectual Property Office of the People's Republic of China in counterpart Chinese Patent Application No. 201510783372.0.
Communication dated Mar. 5, 2018, issued by the State Intellectual Property Office of the People's Republic of China in counterpart Chinese Patent Application No. 201510474026.4.
Communication dated Mar. 20, 2018, issued by the State Intellectual Property Office of the People's Republic of China in counterpart Chinese Patent Application No. 201510671103.5.
Communication dated Mar. 20, 2018, issued by the State Intellectual Property Office of the People's Republic of China in counterpart Chinese Patent Application No. 201480030229.8.
Office Action dated Feb. 14, 2018, issued by the United States Patent and Trademark Office in U.S. Appl. No. 15/185,808.
Office Action dated Apr. 3, 2018, issued by the United States Patent and Trademark Office in U.S. Appl. No. 14/329,179.
Communication dated Apr. 23, 2018, issued by the State Intellectual Property Office of the People's Republic of China in counterpart Chinese Patent Application No. 201480003845.4.
Communication dated Apr. 27, 2018, issued by the State Intellectual Property Office of the People's Republic of China in counterpart Chinese Patent Application No. 201510783629.2.
Communication dated May 4, 2018, issued by the State Intellectual Property Office of the People's Republic of China in counterpart Chinese Patent Application No. 201610020948.2.
Communication dated May 22, 2018, issued by the Japanese Patent Office in counterpart Japanese Patent Application No. 2014-551195.
Communication dated May 31, 2018, issued by the State Intellectual Property Office of the People's Republic of China in counterpart Chinese Patent Application No. 201610280519.9.
Communication dated Jun. 11, 2018, issued by the European Patent Office in counterpart European Patent Application No. 16164994.2.
Communication dated Jun. 11, 2018, issued by the European Patent Office in counterpart European Patent Application No. 14823080.8.
Communication dated Jul. 12, 2018 issued by the European Patent Office in counterpart European patent Application No. 16164994.2.
Communication dated Jul. 26, 2018 issued by the State Intellectual Property Office of P.R. China in counterpart Chinese Patent Application No. 201380013096.9.
Communication dated Jul. 30, 2018 issued by the European Patent Office in counterpart European Patent Application No. 16167682.0.
Communication dated Aug. 24, 2018 issued by the State Intellectual Property Office of P.R. China in counterpart Chinese Patent Application No. 201510670159.9.
Communication dated Sep. 21, 2018 issued by the State Intellectual Property Office of P.R. China in counterpart Chinese Patent Application No. 201480030229.8.
Communication dated Sep. 4, 2018, issued by the Chinese Patent Office in counterpart Chinese Application No. 201510474026.4.
Communication dated Sep. 17, 2018, issued by the Chinese Patent Office in counterpart Chinese Application No. 201510783629.2.
Communication dated Sep. 26, 2018, issued by the Chinese Patent Office in counterpart Chinese Application No. 201610020950.X.
Communication dated Nov. 6, 2018, issued by the Chinese Patent Office in counterpart Chinese Application No. 201480003845.4.
Communication dated Nov. 12, 2018, issued by the Chinese Patent Office in counterpart Chinese Application No. 201510670163.5.
Communication dated Nov. 12, 2018, issued by the European Patent Office in counterpart European Application No. 14822315.9.
Office Action dated Oct. 26, 2018, issued by the United States Patent and Trademark Office in U.S. Appl. No. 14/329,179.
Communication dated Oct. 31, 2018, issued by the State Intellectual Property Office of P.R. China in counterpart Chinese Application No. 201610628473.5.
Communication dated Nov. 21, 2018, issued by the State Intellectual Property Office of P.R. China in counterpart Chinese Application No. 201610482143.X.
Communication dated Nov. 21, 2018, issued by the State Intellectual Property Office of P.R. China in counterpart Chinese Application No. 201480049835.4.
Communication dated Nov. 26, 2018, issued by the State Intellectual Property Office of P.R. China in counterpart Chinese Application No. 201610480507.0.
Communication dated Nov. 30, 2018, issued by the State Intellectual Property Office of P.R. China in counterpart Chinese Application No. 201380013096.9.
Communication dated Nov. 30, 2018, issued by the State Intellectual Property Office of P.R. China in counterpart Chinese Application No. 201510474027.9.
Communication dated Dec. 4, 2018, issued by the State Intellectual Property Office of P.R. China in counterpart Chinese Application No. 201610020948.2.
Communication dated Dec. 4, 2018, issued by the State Intellectual Property Office of P.R. China in counterpart Chinese Application No. 201510670159.9.
Communication dated Dec. 5, 2018, issued by the State Intellectual Property Office of P.R. China in counterpart Chinese Application No. 201510783372.0.
Communication dated Dec. 5, 2018, issued by the State Intellectual Property Office of P.R. China in counterpart Chinese Application No. 201510671103.5.
Communication dated Dec. 13, 2018, issued by the Korean Intellectual Property Office in counterpart Korean Application No. 10-2018-0122820.
Communication dated Dec. 20, 2018, issued by the State Intellectual Property Office of P.R. China in counterpart Chinese Application No. 201610020950.X.
Communication dated Dec. 28, 2018, issued by the Korean Intellectual Property Office in counterpart Korean Application No. 10-2015-0050879.
Communication dated Dec. 28, 2018, issued by the Korean Intellectual Property Office in counterpart Korean Application No. 10-2015-0050944.
Communication dated Jan. 10, 2019, issued by the State Intellectual Property Office of P.R. China in counterpart Chinese Application No. 201610020779.2.
Communication dated Jan. 11, 2019, issued by the State Intellectual Property Office of P.R. China in counterpart Chinese Application No. 201510474026.4.
Communication dated Jan. 11, 2019, issued by the State Intellectual Property Office of P.R. China in counterpart Chinese Application No. 201610280519.9.
Translation of JP2001086205, Mar. 2001.
Communication dated Jul. 16, 2019, issued by the State Intellectual Property Office of P.R. China in counterpart Chinese Application No. 201510474026.4.
Communication dated Jul. 19, 2019, issued by the State Intellectual Property Office of P.R. China in counterpart Chinese Application No. 201610482143.X.
Communication dated Jul. 30, 2019, issued by the Korean Intellectual Property Office in counterpart Korean Patent Application No. 10-2015-0050944.
Communication dated Aug. 22, 2019, issued by the State Intellectual Property Office of P.R. China in counterpart Chinese Application No. 201610628473.5.
Communication dated Aug. 23, 2019, issued by the European Patent Office in counterpart European Application No. 14823080.8.
Communication dated Sep. 12, 2019, issued by the State Intellectual Property Office of P.R. China in counterpart Chinese Application No. 201610480507.0.
Office Action dated Sep. 26, 2019, issued by the U.S. Patent and Trademark Office in U.S. Appl. No. 16/397,830.

(56) References Cited

OTHER PUBLICATIONS

Communication dated Sep. 27, 2019, issued by the European Patent Office in counterpart European Application No. 14823080.8.
Communication dated Feb. 11, 2019, issued by the Chinese Patent Office in counterpart Chinese Application No. 201510783629.2.
Communication dated Mar. 20, 2019, issued by the European Patent Office in counterpart European Application No. 14823080.8.
Communication dated Mar. 21, 2019, issued by the Chinese Patent Office in counterpart Chinese Application No. 201480030229.8.
Communication dated Mar. 28, 2019, issued by the European Patent Office in counterpart European Application No. 16 182 538.5.
Communication dated Apr. 30, 2019, issued by the European Patent Office in counterpart European Application No. 19161259.7.
Communication dated Oct. 11, 2019 issued by the State Intellectual Property Office of P.R. China in counterpart Chinese Application No. 201510671103.5.
Communication dated Oct. 25, 2019 issued by the State Intellectual Property Office of P.R. China in counterpart Chinese Application No. 201480003845.4.
Communication dated Nov. 13, 2019 issued by the State Intellectual Property Office of P.R. China in counterpart Chinese Application No. 201510474026.4.
Communication dated Dec. 19, 2019 issued by the State Intellectual Property Office of P.R. China in counterpart Chinese Application No. 201610020948.2.
Communication dated Mar. 16, 2020 issued by the State Intellectual Property Office of the P.R.China in Chinese Application No. 201510474027.9.
Communication dated Mar. 24, 2020 issued by the State Intellectual Property Office of the P.R.China in Chinese Application No. 201610020948.2.
Communication dated Apr. 9, 2020 issued by the European Patent Office in European Application No. 19210090.7.
Communication dated Apr. 10, 2020 issued by the State Intellectual Property Office of the P.R.China in Chinese Application No. 201610280519.9.
Communication dated Apr. 20, 2020 issued by the State Intellectual Property Office of the P.R.China in Chinese Application No. 2014800038454.
Communication dated May 15, 2020 issued by the State Intellectual Property Office of the P.R.China in Chinese Application No. 201510671103.5.
Communication dated May 28, 2020 issued by the European Patent Office in European Application No. 19161259.7.
Communication dated May 28, 2020 issued by the Korean Intellectual Property Office in Korean Application No. 10-2020-0037113.
Communication dated Jan. 2, 2020, issued by the State Intellectual Property Office of P.R. China in counterpart Chinese Application No. 201510670159.9.
Communication dated Jan. 7, 2020, issued by the State Intellectual Property Office of P.R. China in counterpart Chinese Application No. 201510474027.9.
Communication dated Jan. 8, 2020, issued by the Korean Intellectual Property Office in counterpart Korean Application No. 10-2019-0138947.
Communication dated Jan. 14, 2020, issued by the Indian Patent Office in counterpart Indian Application No. 201627001575.
Communication dated Jan. 30, 2020, issued by the Indian Patent Office in counterpart Indian Application No. 2729/MUMNP/2015.
Communication dated Feb. 17, 2020, issued by the Indian Patent Office in counterpart Indian Application No. 201627003720.
Communication dated Feb. 27, 2020, issued by the State Intellectual Property Office of P.R. China in counterpart Chinese Application No. 201510474026.4.
Communication dated Jun. 3, 2020 by the State Intellectual Property Office of P.R. China in counterpart Chinese Patent Application No. 201510783629.2.
Communication dated Jun. 8, 2020 by the State Intellectual Property Office of P.R. China in counterpart Chinese Patent Application No. 201510670159.9.
Communication dated Jul. 28, 2020 by the State Intellectual Property Office of P.R. China in counterpart Chinese Patent Application No. 201910151318.2.
Communication dated Jul. 29, 2020 by the Korean Intellectual Property Office in counterpart Korean Patent Application No. 10-2019-0138947.
Communication dated Nov. 25, 2020 issued by the European Patent Office in European Application No. 20171090.2.
Communication dated Oct. 29, 2020 issued by Intellectual Property India in Indian Application No. 201628040317.
Communication dated Nov. 13, 2020, issued by the State Intellectual Property Office of P.R. China in counterpart Chinese Application No. 201510783372.0.
Chinese Patent Office, communication dated Dec. 23, 2020, in copending Application No. 201510783629.2.
European Patent Office, communication dated Jan. 11, 2021, in copending Application No. 20196463.2.

* cited by examiner

METHOD AND APPARATUS FOR PROVIDING EVENT OF PORTABLE DEVICE HAVING FLEXIBLE DISPLAY UNIT

CROSS-REFERENCE TO RELATED APPLICATION

This application is a Continuation of U.S. application Ser. No. 15/251,843 filed on Aug. 30, 2016, in the U.S. Patent and Trademark Office, which is a Continuation of U.S. application Ser. No. 13/735,484 filed on Jan. 7, 2013, in the United States Patent and Trademark Office, now U.S. Pat. No. 9,491,272 issued on Nov. 8, 2016, which claims priority from Korean Patent Application No. 10-2012-0002968, filed on Jan. 7, 2012, in the Korean Intellectual Property Office, the entire disclosures of which are hereby incorporated by reference.

BACKGROUND

1. Field

Apparatuses and methods consistent with exemplary embodiments relate to a portable terminal and a method of operating the same, and more particularly, to a portable terminal having a flexible display unit, and a method of operating the same.

2. Description of the Related Art

With recent development of digital technologies, various portable terminals, which can communicate and process personal information while moving, such as a mobile communication terminal, a personal digital assistant (PDA), an electronic organizer, a smart phone, and a tablet PC, etc., are being introduced. Such a portable terminal has various functions such as a voice call function, message transmission including a short message service (SMS) and a multimedia message service (MMS), a video call function, an electronic organizer function, a photographing function, e-mail transmission and reception, a broadcast replay function, an Internet function, a music replay function, a schedule management function, a social network service, a messenger service, a dictionary function and a game function, etc.

Further, portable terminals are becoming ubiquitous. Hence, in public places where noise by the portable terminal should be restricted (e.g., a conference room, a classroom and a library, etc.), a user usually sets the portable terminal in silent mode. Even in a situation where the terminal is set in silent mode, when an alarm event such as a call reception or a message reception, etc. is generated, the display unit can be turned on. In such a case, user may turn off the portable terminal, or may cover the terminal, put the terminal upside down, or hide the terminal, etc. At this time, since the user cannot check the portable terminal, the user cannot recognize even an urgent alarm event. That is, in case a call or a message is received in a situation where the display of the portable terminal is not used (e.g., the terminal is placed upside down or the display unit is covered, etc.), the received information cannot be appropriately transmitted to the user.

SUMMARY

One or more exemplary embodiments provide a portable terminal capable of extending the display area to the side as well as the front by implementing a flexible display in a portable terminal, and a method of processing an event using the same.

One or more exemplary embodiments also provide a portable terminal having a flexible display unit, which may divide the flexible display unit into a main display area of the front and an auxiliary display area of the side, and output event information of an alarm event, and a method of processing an event using the same.

One or more exemplary embodiments also provide a portable terminal having a flexible display unit, which may support an output of event information by silent alarm mode by extending the flexible display unit to the side of the portable terminal body, and a method of processing an event using the same.

One or more exemplary embodiments also provide a portable terminal having a flexible display unit, which may output event information of an alarm event using an auxiliary area of the flexible display unit by turning the portable terminal state to silent alarm mode according to the state of the portable terminal when an alarm event is generated, and method of processing an event using the same.

One or more exemplary embodiments also provide a portable terminal having a flexible display unit, which may process an output of event information of an alarm event using an auxiliary display area of the flexible display unit by supporting the change to silent alarm mode based on the menu setting, and a method of processing an event using the same.

According to an aspect of an exemplary embodiment, there is provided a portable terminal including: a flexible display unit disposed on a front surface of the portable terminal and extending to a side surface of the portable terminal, the flexible display unit including a main display area on the front surface, and an auxiliary display area on the side surface; a sensor that detects a state of the portable terminal; and a controller that selectively outputs event information on at least one of the main display area and the auxiliary display area of the flexible display unit according to the detected state of the portable terminal.

According to an aspect of another exemplary embodiment, there is provided a method for processing an event of a portable terminal including a main display area formed on a front surface of the portable terminal, and an auxiliary display area formed on a side surface of the portable terminal, the method including: determining a state of the portable terminal; changing a mode of the portable terminal into a silent alarm mode when the main display area is not being used; receiving an alarm event in the silent alarm mode; and outputting event information according to the alarm event on the auxiliary display area.

According to an aspect of another exemplary embodiment, there is provided a method for processing an event of a portable terminal including a main display area formed on a front surface of the portable terminal, and an auxiliary display area formed on a side surface of the portable terminal, the method including: receiving an alarm event; determining a state of the portable terminal when receiving the alarm event; determining whether to enter a silent alarm mode according to the determined state of the portable terminal; and outputting event information according to the alarm event on the auxiliary display area when entering the silent alarm mode.

According to an aspect of another exemplary embodiment, there is provided a computer readable recording medium storing a program for execution by a portable terminal including a flexible display unit including a main display area and an auxiliary display area, the program configured to function as a unit that selectively outputs event information according to an alarm event on at least one of the main display area and the auxiliary display area of the flexible display unit according to a state of the portable terminal.

According to an aspect of another exemplary embodiment, there is provided a method for processing an event of a portable terminal including a flexible display area including a main display area formed on a front surface of the portable terminal, and an auxiliary display area formed on a side surface of the portable terminal, the method including: receiving event information in a silent alarm mode; detecting a state of the portable terminal; and selectively outputting event information on at least one of the main display area and the auxiliary display area of the flexible display area according to the detected state of the portable terminal.

BRIEF DESCRIPTION OF THE DRAWINGS

The above and other aspects will be more apparent from the following detailed description in conjunction with the accompanying drawings, in which.

DETAILED DESCRIPTION OF EXEMPLARY EMBODIMENTS

Exemplary embodiments will be described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure.

According to one or more exemplary embodiments, in a situation when the main display area of the front of the portable terminal is not used (e.g., a situation when the main display area of the front surface is covered by other objects (e.g., a case of a portable terminal and a notebook, etc.), or the front surface is directed downward by contacting the surface of a table, etc.), if an alarm event occurs, event information for the alarm event may be provided through an auxiliary display area on a side surface of the portable terminal. The alarm event may include, for example, an event such as a call reception, a message reception (e.g., a message reception based on a short message service (SMS)/multimedia message service (MMS)), an e-mail reception, an information reception of a push service, or an alarm reception of a social network service (SNS), etc. However, these are only non-limiting examples. It will be appreciated that an alarm event may be any event of which a user would desire to be informed.

To this end, according to one or more exemplary embodiments, both ends of a portable terminal are made in a bent form, and the portable terminal comprises a flexible display unit integrally including a main display area of the front surface of the portable terminal and an auxiliary display area of the side surface of the portable terminal, a sensor that detects the state of the portable terminal, and a controller that detects the state of the portable terminal at the time of an alarm event occurrence, and controls the flexible display unit to output event information using at least one of the main display area and the auxiliary display area of the flexible display unit. Moreover, according to one or more exemplary embodiments, a conversion of operation mode into silent alarm mode may be selected by a setting on the portable terminal.

Figure 1:
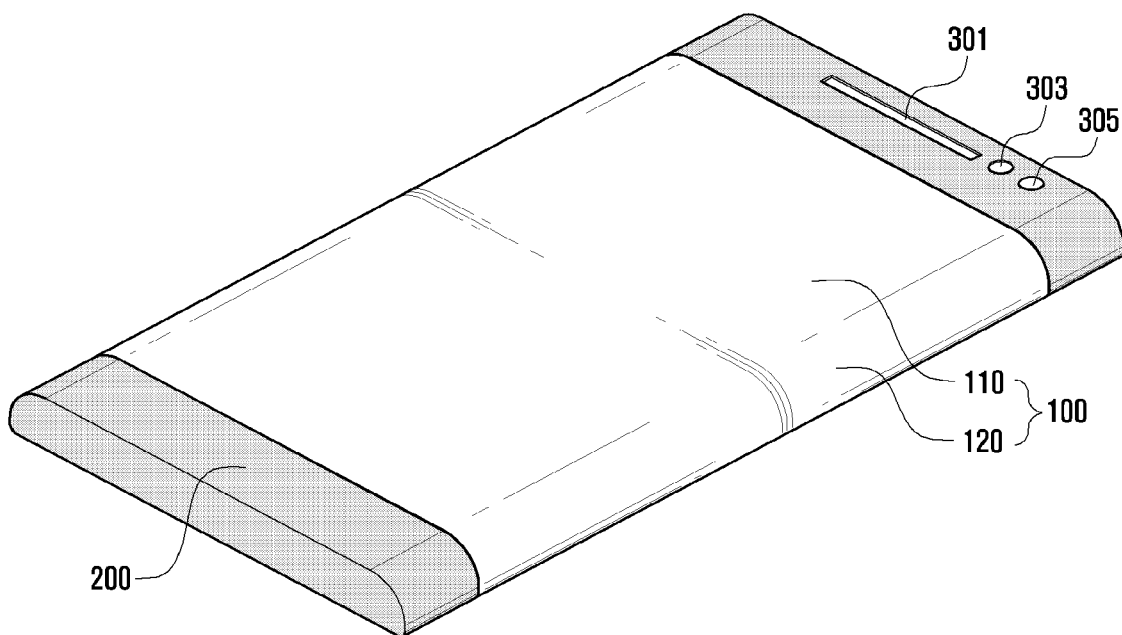
FIGS. 1 to 3 illustrate a portable terminal having a flexible display unit according to an exemplary embodiment.
Figure 2:
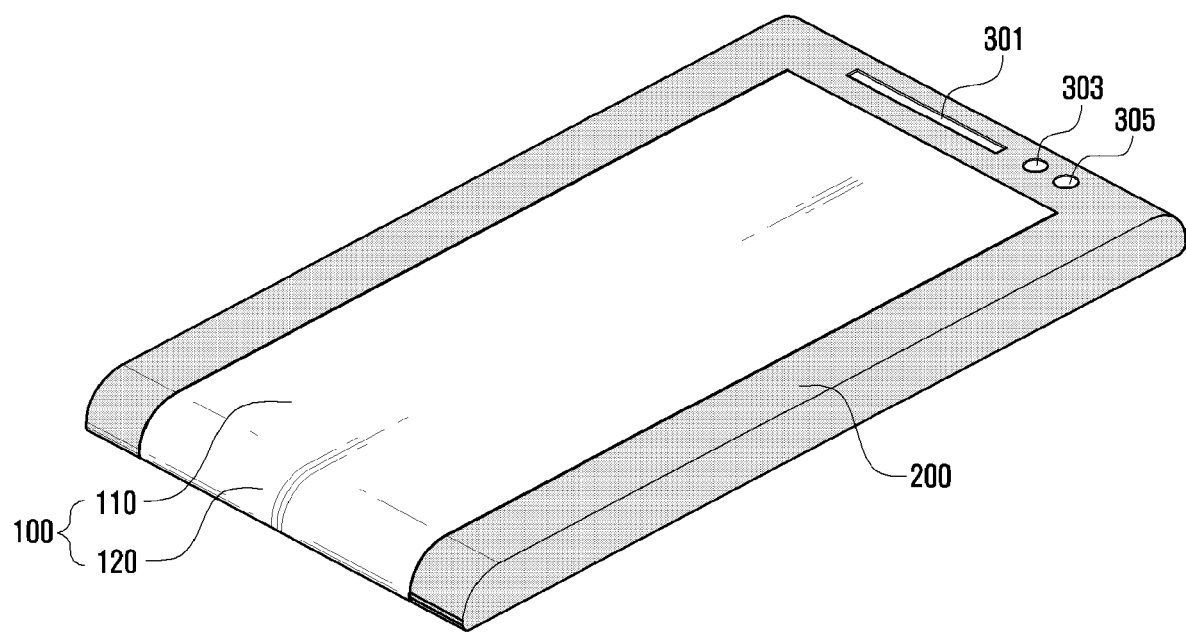
Figure 3:
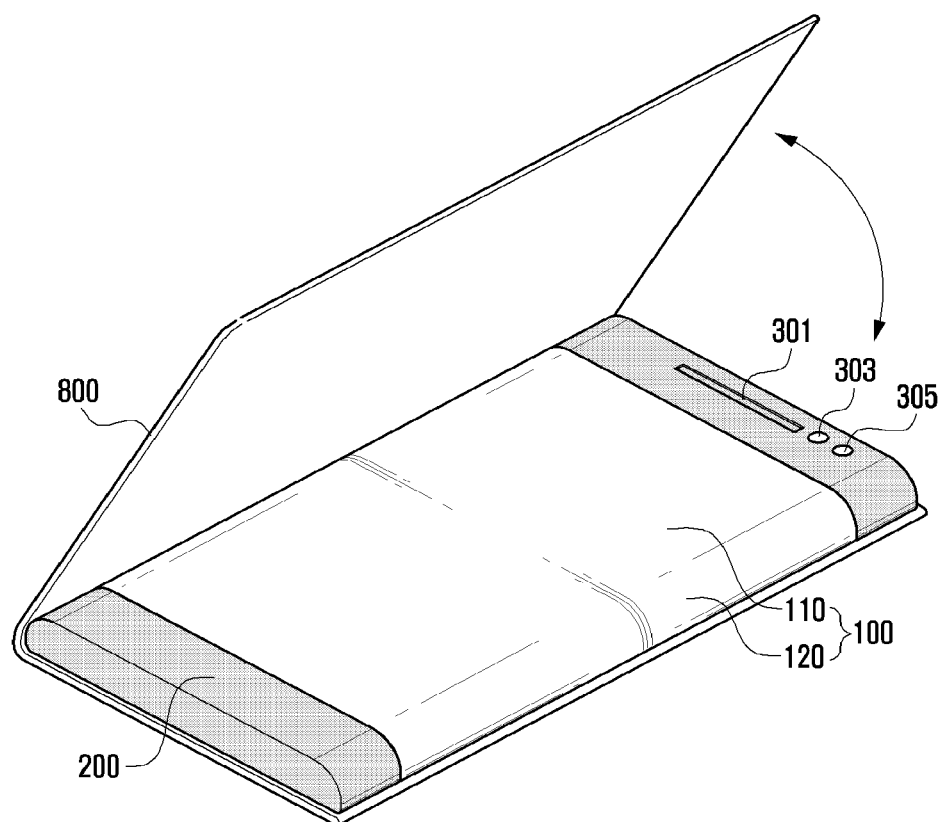
Figure 3:
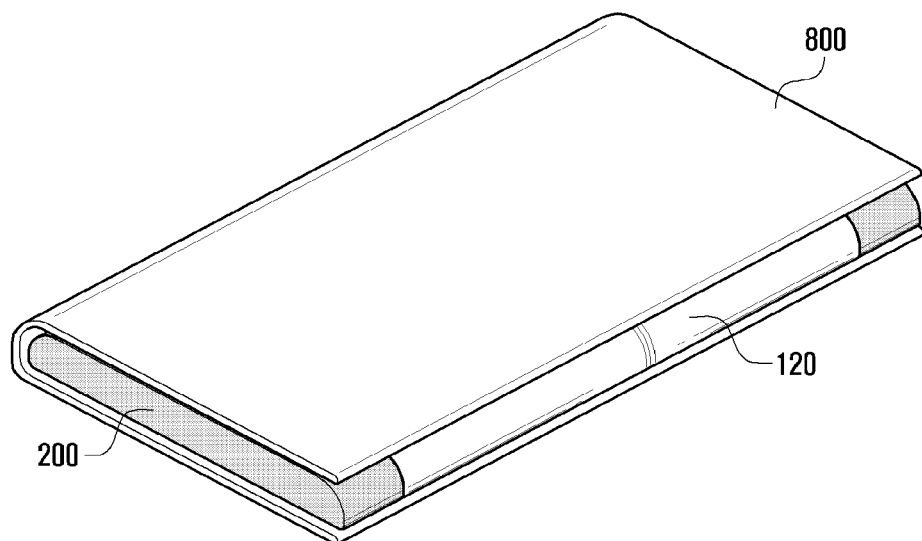

FIGS. 1 to 3 illustrate a portable terminal having a flexible display unit according to an exemplary embodiment.

As illustrated in FIGS. 1 to 3, a portable terminal according to an exemplary embodiment includes a flexible display unit 100, a main body 200 on which the flexible display unit 100 is mounted, and an additional device which is formed on the main body 200 and performs a function of the portable terminal, etc. In FIGS. 1 to 3, the additional device may include a speaker 301, a microphone, a sensor, such as an illumination sensor 303 and/or and a front surface camera module 305, etc., and one or more physical buttons, etc.

The flexible display unit 100 is a bendable display device, and may be bent or rolled without damage through a substrate that is thin and flexible like paper. Since such a flexible display unit 100 uses a plastic substrate, rather than a generally used glass substrate, the flexible display unit 100 may be formed using a low temperature manufacturing process, rather than a conventional manufacturing process, so that the substrate is not damaged. The flexible display unit 100 uses a plastic film in a liquid crystal display (LCD), a light emitting diode (LED), an organic LED, and an active matrix OLED (AMOLED), etc., thereby giving flexibility to the flexible display unit 100, such that the flexible display unit is capable of being folded and unfolded. Such a flexible display unit 100 is not only thin and light, and strong against outside impact, but also may be bent and be manufactured in various forms.

The flexible display unit 100 includes an active matrix screen of a certain screen size (e.g., 3 inches, 4 inches, 4.65 inches, 5 inches, 6.5 inches, and 8.4 inches, etc.) according to the size of the portable terminal, and may be extended to at least one side surface (e.g., at least one of the left, right, upper and lower side surfaces) of the portable terminal, be folded to less than the radius of curvature (e.g., 5 cm, 1 cm, 7.5 mm, 5 mm, and 4 mm, etc.), in which the flexible display unit 100 may be operated, and be coupled with the side surface of the main body 200. The display area shown on the front surface of the flexible display unit 100 is called a main display area 110 of the front surface, and the display area, which is extended from the main display area, is bent to at least one of the side surfaces of the main body 200, and is shown on the side surface of the main body 200, is called an auxiliary display area 120 of the side surface.

The main display area 110 and the auxiliary display area 120 have been distinguished for the convenience of explanation, and at least one end of the main display area 110 and the auxiliary display area 120 is bent, and may be implemented by one flexible display unit 100 whose at least one bent end is extended to at least one side surface of the portable terminal, or may be implemented by one flexible display unit 100 whose at least one bent end is extended to the rear side surface of the portable terminal. Hence, the display area of the front surface of the portable terminal is called the main display area 110 and the display area on the side surface of the portable terminal is called the auxiliary display area 120. That is, the main display area 110 of the front surface of the portable terminal and the auxiliary display area 120 of the side surface of the portable terminal are implemented by one integrally formed flexible display unit 100.

Likewise, as shown in FIGS. 1 to 3, the flexible display unit 100 is divided into the main display area 110 of the front surface and the auxiliary display area of the side surface, and may provide an alarm event using the auxiliary display area 120. In a situation where the main display area 110 of the front surface of the portable terminal is not used, when an alarm event occurs, event information for the alarm event may be provided through the auxiliary display area 120 of the side surface. One example of such a situation may include when the main display area of the front surface is covered by an object, as shown in FIG. 3 where a case 800 of the portable terminal covers the portable terminal, or for example a notebook, etc. Another example of a situation may include where the front surface is directed downward by contacting the surface of the table, etc.

For example, the portable terminal may be turned upside down for a meeting. That is, may the state of the portable terminal may be changed, for example, by making the main display area 110 directed downward to contact the surface of the table. Further, the main display area 110 may be covered by putting the portable terminal in a separate case 800 as shown in FIG. 3, or the main display area 110 may be covered using a notebook, etc.

The portable terminal may detect the state of the portable terminal using the sensor. The state of the portable terminal may be detected by an illumination sensor that detects a change of the amount of light, an operation sensor (e.g., a geomagnetic sensor and an acceleration sensor, etc.) that detects the position of the portable terminal, or a timer, etc. Here, as the sensor, a plurality of sensors (e.g., sensor 1, sensor 2, and sensor 3, etc.) may be integrated in one chip, or a plurality of sensors may be implemented as separate chips.

For example, the portable terminal may determine the current state according to an illumination value detected by the illumination sensor. The portable terminal may also determine the current state according to the position information (e.g., values measured for X-axis, Y-axis and Z-axis) detected by the operation sensor. Further, the portable terminal may determine the current state according to the current time detected by the timer. The case where the timer is used may correspond to an operation that determines whether the current time of the portable terminal corresponds to the time which has been set by user as silent alarm mode automatic execution, and enters silent alarm mode if the current time corresponds to the user-set time.

Hereinafter, it is described that first the illumination value is determined by the illumination sensor, and if the measured illumination value satisfies predetermined criteria (e.g., the main display area 110 is covered as the above, and the value is less than a certain preset value), the state where the portable terminal is placed is determined by the additional operation sensor, and the operation of determining the output direction of the auxiliary display area 120 according to the state is illustrated. However, according to an exemplary embodiment, the portable terminal may be set to be operated according to only one of the sensors, or may be set to be operated the combination of three or more sensors.

Further, as a result of determination by the value measured based on the sensor, if it is determined that the portable terminal is in the state where the main display area 110 is not used (e.g., the reversed state, or the state where the main display area 110 is covered, etc.), it is determined that the portable terminal is in the silent alarm mode. If the illumination sensor detects the illumination change and transmits an electronic signal corresponding thereto to the controller, the controller may compare the transmitted signal with a preset value, and thereby the state of the portable terminal may be determined. At this time, in case the illumination value by the illumination sensor is less than a preset value, the controller may determine that the portable terminal has entered the silent alarm mode, and changes the operation mode. For example, assuming that the brightest illumination measured by the illumination sensor is 100, the darkest illumination is 0, and a preset standard illumination is 30, in case the illumination measured by the illumination sensor is the same as or less than the standard value 30, it is determined that the portable terminal has entered the silent alarm mode.

The silent alarm mode corresponds to a mode that prohibits the output of event information by the main display area 110 of the front surface, and allows the output of the event information by the auxiliary display area 120 of the side surface. Furthermore, in the silent alarm mode, a screen output may be performed and the sound output and vibration output may be prohibited, which may be variously defined according to settings of the portable terminal. The event information output based on the auxiliary display area 120 may be performed by outputting the event information on the main display area 110 in one color (e.g., black color), or the power of the main display area 110 may be separated from that of the auxiliary display area 120 so that the power supply to the main display area 110 is blocked.

Further, a right hand mode and a left hand mode of the portable terminal may be defined using the environment setting provided in the portable terminal or a separate application. Further, when the right hand mode or the left hand mode is set, the portable terminal may operate the auxiliary display area 120 of only the side surface corresponding to the determined mode. For example, in case the portable terminal is set to the right hand mode in FIG. 1, event information is output through the auxiliary display area 120 of the right side surface, and in case the portable terminal is set to the left hand mode, the event information is output through the auxiliary display area 120 of the left side surface.

The portable terminal may receive an alarm event after changing into the silent alarm mode. The alarm event may include a call reception, a message reception, an information reception of a push service, a mail reception and an alarm reception of an SNS, etc. as explained above. When receiving an alarm event in the silent alarm mode, the portable terminal may output event information according to the alarm event based on the auxiliary display area 120 of the side surface. Here, the output of the event information may be continually output until an input to the portable terminal is received (e.g., a cancellation input), or may be output for a preset period of time (e.g., 1 second, 3 seconds, and 5 seconds, etc.) and then stopped.

When receiving the alarm event at the silent alarm mode, the portable terminal may determine the type of the alarm event, and extract event information according to the type of the determined alarm event. Further, the extracted event information may be processed in the form which may be displayed in the auxiliary display area 120, and the information may be outputted. For example, when determining a call-related alarm event, calling information (e.g., a phone number) is be extracted, and the extracted calling information and event processing method is compared with the user definition. Further, the calling information is processed to be the event information according to a priority (e.g., important or common) which is set for the calling information, and the event information is output on the auxiliary display area 120.

Further, when determining a message alarm event, at least one of the calling information (e.g., a phone number) and message content may be extracted, and the extracted calling information may be compared with the user definition of the event processing method. Further, at least one of the calling information and message content may be processed into the event information according to the priority (e.g., important or common) which is preset for the calling information, and the event information may be outputted in the auxiliary display area 120.

Further, the method of processing the alarm event has been illustrated in the above based on the calling information, but according to an exemplary embodiment, the processing method for the alarm event for each event type may be determined. That is, the priority may be set individually for each alarm event such as a call reception, a message reception, an information reception of a push service, an e-mail reception, and an alarm reception of an SNS, etc., and accordingly, event information may be outputted by processing to be different types of event information.

Further, event information, which is intended to be outputted through the auxiliary display area 120, may be processed differently according to the event type in the form of at least one of a calling number, a caller's name, message content (e.g., a scroll function support), an icon (an icon distinguished according to a call, a message, an e-mail, a push service, and an SNS, etc.), and a color (displaying the whole or part of the auxiliary display area 120 differently according to the preset priority), etc. Such a method of outputting event information will be described later with reference to FIG. 11.

Figure 4:
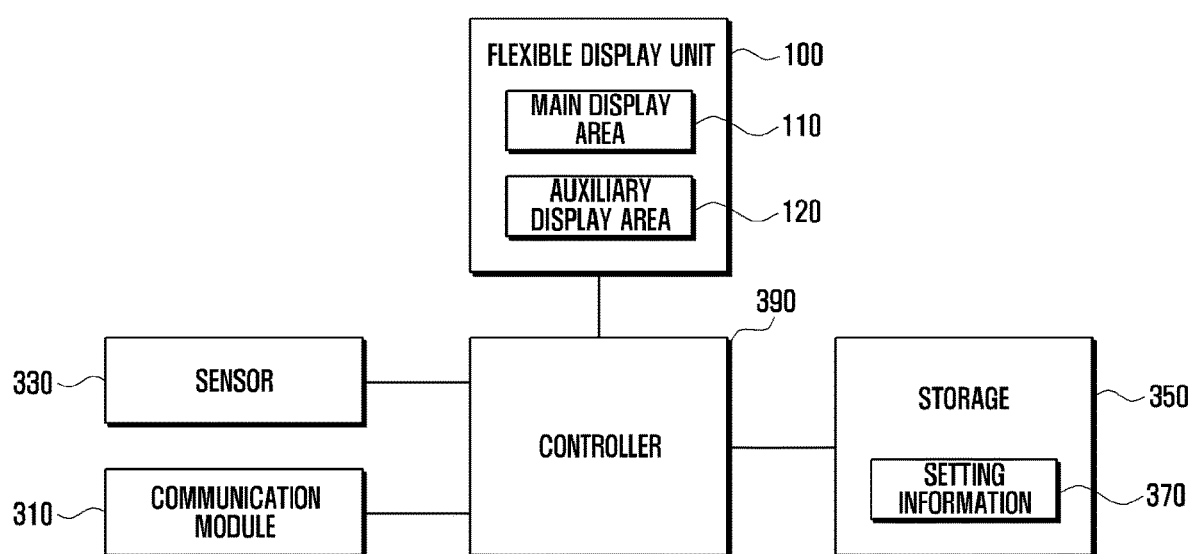
FIG. 4 schematically illustrates a constitution of a portable terminal according to an exemplary embodiment.

FIG. 4 schematically illustrates the constitution of a portable terminal according to an exemplary embodiment of the present invention.

Referring to FIG. 4, a portable terminal includes a communication module 310, a flexible display unit 100, a sensor 330, a storage 350, and a controller 390. Further, the portable terminal may further comprise an audio processor including, for example, a microphone and a speaker, a digital broadcast module configured to receive a digital broadcast (e.g., a mobile broadcast such as a digital multimedia broadcasting (DMB) and a digital video broadcasting (DVB)), a camera configured to photograph a static image and a dynamic image of an object, at least one local wireless communication module configured to support a communication function based on a local wireless communication method, such as, for example, a Bluetooth communication, an infrared data association (IrDA) communication, a radio frequency identification (RFID) communication and a near field communication (NFC), etc., an input unit configured to support an input based on, for example, a hard key or a soft key, and a battery for supplying power to the above components, etc., but the explanation thereof is omitted here for clarity.

The communication module 310 is configured to communicate with an external server or another portable terminal through a communication network. The communication module 100 may include, for example, a radio frequency (RF) module for supporting a mobile communication service such as a voice call, an image call and data communication, etc. based on the mobile communication. Further, the communication module 100 may support an Internet communication service such as a voice call, an image call and a data communication, etc. based on an Internet protocol (IP). In particular, the communication module 100 may receive an alarm event from an external server or another portable terminal. Further, the communication module 100 is not limited to a certain communication module and communication method, but may be implemented by various forms of communication modules so that the mobile device may communicate with the external server or another mobile device.

The flexible display unit 100 may display a screen related with the operation state of the portable terminal. For example, the display unit 100 may display a home screen, a menu screen, a call sending/receiving screen, a message writing/receiving screen, a chatting screen, and/or each execution screen according to the execution of an application of the portable terminal. The flexible display unit 100 is divided into a main display area 110 of the front surface of the portable terminal and an auxiliary display area 120 of the side surface of the portable terminal, and event information may be output according to an alarm event such as a call reception, a message reception, an information reception according to a push service, and an information reception according to an SNS, etc. through the auxiliary display area 120. An example of operating an auxiliary display area 120 of the flexible display unit 100 will be described later.

Further, according to an exemplary embodiment, an LCD is used as the flexible display unit 100, but other display devices such as an LED, an OLED, and AMOLED, etc. may also be used. Further, the flexible display unit 100 may include an interface which supports a touch-based input. For example, the flexible display unit 100 may support touch-based various user inputs by the constitution of a touch screen, may generate an input signal according to a user input, and may transmit the generated input signal to the controller 390. Further, when displaying various screens as explained above, the flexible display unit 100 may support a display of a screen by a horizontal mode according to a rotational direction (or placed direction) of the portable terminal, a display of a screen by a vertical mode according to the rotational direction (or placed direction) of the portable terminal, and a display of an adaptive screen conversion according to a change between the horizontal mode and the vertical mode.

The sensor 330 may detect at least one of various changes such as a position change, illumination change and acceleration change, etc., and transmit the corresponding electrical signal to the controller 390. That is, the sensor 330 may sense a state change of the portable terminal, generate a sensing signal according thereto, and transmit the generated signal to the controller 390. The sensor 330 may comprise various sensors. When operating the portable terminal (or based on a setting of the portable terminal), as long as power is supplied to at least one sensor which is set according to the control of the controller, the state change of the portable terminal may be sensed. According to an exemplary embodiment, the state change of the portable terminal may be detected by always operating the sensor 330. Alternatively, the sensor 330 may be operated according to a predefined setting of the portable terminal, an alarm event detection time point, or a manual operation.

Such a sensor 330 may include at least one of any type of sensing device which may detect the state change of the portable terminal. For example, the sensor 330 may comprise at least one of an acceleration sensor, a gyro sensor, an illumination sensor, a proximity sensor, a pressure sensor, a noise sensor (e.g., a microphone), a video sensor (e.g., camera module), or a timer, etc.

As a way to detect various environments (e.g., the state where the front surface of the portable terminal contacts the surface of the table (turned-upside-down state), or the state where the main display area 120 is covered by the case 800 of the portable terminal) which do not use the main display area 110, an operation of at least one combination of an illumination sensor and an acceleration sensor, etc. is illustrated according to an exemplary embodiment. However, other combinations of sensors or a single sensor may be used. That is, the state of the portable terminal may be detected using one or more sensors. Here, it is assumed that the sensor 330 is the acceleration sensor, and the operation of detecting the position of the portable terminal will be described with reference to FIG. 15.

Figure 15:
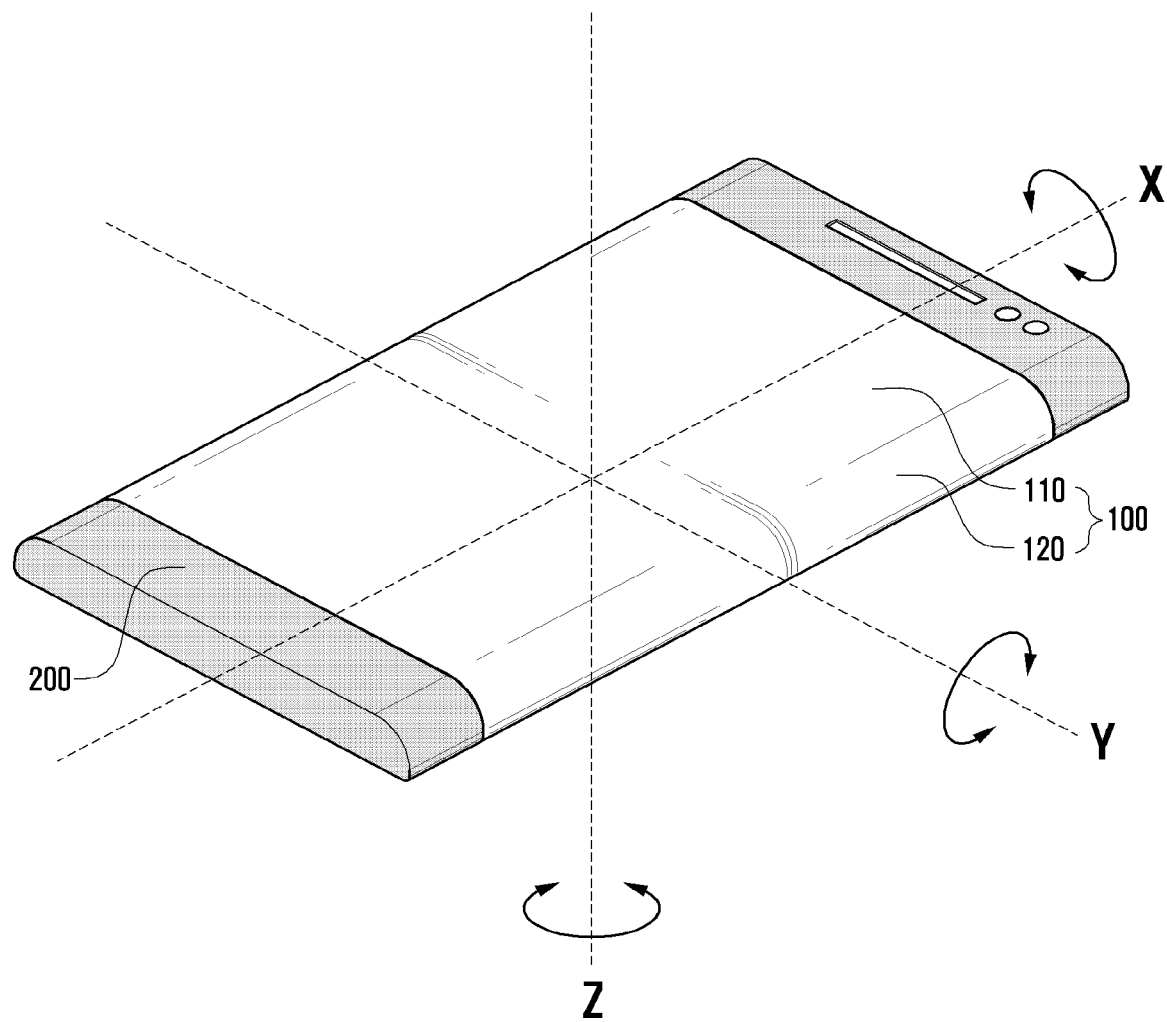
FIG. 15 schematically illustrates an operation of detecting the position of a portable terminal according to an exemplary embodiment.

FIG. 15 schematically illustrates an operation of detecting the position of a portable terminal according to an exemplary embodiment.

Referring to FIG. 15, in case an alarm event is received by the communication module 310, power is supplied by the control of the controller 390, and the sensor 330 measures a position of the portable terminal. The position of the portable terminal may be detected by always operating the sensor 330. Further, the sensor 330, particularly the acceleration sensor, may be operated after detecting an alarm event.

It is illustrated that the sensor 200 uses the acceleration sensor for detection of the position of the portable terminal. In a case in which the sensor 200 is the acceleration sensor, detection of the portable terminal by the illumination sensor may be omitted. In such a case, when the portable terminal is turned upside down and the main display area of the front surface of the portable terminal contacts the surface of the table, such an operation is possible. However, even when the main display area of the front surface of the portable terminal is directed upward and the rear side of the portable terminal contacts the surface of the table, such an operation is possible. As such, any placement configuration of the portable terminal may be detected by measuring the illumination of the portable terminal using the illumination sensor and measuring the position of the portable terminal for operation of the auxiliary display area 120. Hereinafter, a specific example of measuring the position of the portable terminal by the acceleration sensor will be described.

The sensor 330 may generate an electrical signal by measuring the acceleration of the portable terminal, and transmit the generated electrical signal to the controller 390. For example, assuming the case where the sensor 330 is a tri-axial acceleration sensor, the gravitational acceleration for each of X-axis, Y-axis and Z-axis may be measured. In particular, the sensor 330 measures acceleration which is the result of the movement acceleration plus the gravitational acceleration, but if the portable terminal is not moved, only the gravitational acceleration may be measured. For example, it is assumed that the state where the front surface of the portable terminal is directed upward is the positive (+) direction of the gravitational acceleration, and the state where the rear surface of the portable terminal is directed upward is the negative (−) direction of the gravitational acceleration.

As illustrated in FIG. 15, in case the rear surface of the portable terminal is placed to contact the flat surface, X-axis and Y-axis elements of the gravitational acceleration measured by the sensor 330 are both measured as 0 m/sec$^2$, and only the Z-axis element is measured as a positive value (e.g., +9.8 m/sec$^2$). In contrast, in case the front surface of the portable terminal is placed to contact the flat surface, X-axis and Y-axis of the gravitational acceleration measured by the sensor 330 are measured as 0 m/sec$^2$, and the Z-axis element may be measured as a certain negative value (e.g., −9.8 m/sec$^2$).

Further, assuming that the portable terminal is placed diagonally with the surface of the table, the gravitational acceleration measured by the sensor 330 is measured as a value in which the value of at least one axis is not 0 m/sec$^2$, and at this time, the square root of the sum of the squares of the elements of three axes, i.e., the size of the vector sum, may be a certain value (e.g., 9.8 m/sec$^2$). In the above case, the sensor 330 senses each acceleration for X-axis, Y-axis and Z-axis directions in the coordinate system. Further, each axis and the gravitational acceleration thereof may be changed according to the attached position.

In case the gravitational acceleration transmitted from the sensor 330 is measured by at least one axis element, the position of the portable terminal may be checked (calculated) using the gravitational acceleration for each axis. The position may be indicated by a roll angle ($\Phi$), a pitch angle ($\theta$), and a yaw angle ($\Psi$). The roll angle ($\Phi$) indicates a rotation angle around X-axis, the pitch angle ($\theta$) indicates a rotation angle around Y-axis, and the yaw angle ($\Psi$) indicates a rotation angle around Z-axis. In the case of an example illustrated in FIG. 15, if the gravitational acceleration of the Z-axis transmitted from the sensor 330 is +9.8 m/sec$^2$, the position of the portable terminal indicates that the roll angle and the pitch angle correspond to 0, and thus it is seen that the rear surface of the portable terminal, which receives the gravitational acceleration of Z-axis, is placed in a gravitational direction. Any position of the portable terminal may be sensed through the above method, and a position detector that detects the position of the portable terminal may be additionally implemented.

The controller 390 may determine the position of a portable terminal using an algorithm such as, for example, a position calculation algorithm using a Euler angle, a position calculation algorithm using an extended Kalman filter, and an acceleration-predicting switching algorithm, etc. That is, a method of measuring the position of the portable terminal using an accelerometer, etc. may be implemented in various manners.

Referring to FIG. 4 again, the storage 350 is configured to store various applications and data which are processed in the portable terminal, and may comprise one or more nonvolatile memories and volatile memories. The storage 350 may comprise at least one of a read only memory (ROM), a flash memory, a random access memory, an internal hard disk drive, an external hard disk drive, or an external storage medium, etc. Further, the storage 350 may continually or temporarily store the operating system of the portable terminal, a program and data related with the display control operation of the flexible display unit 100, detection of the state of the portable terminal using the sensor 330 and a program and data related to the control operation according thereto. In particular, the storage 350 may store setting information 370 related to the main display area 110 and the auxiliary display area 120 of the flexible display unit 100.

The setting information 370 may include, for example, standard condition information for determining whether the value measured by the sensor 330 (particularly, the illumination sensor) satisfies conditions for entering the silent alarm mode, priority information which is set for each event type or each set of sending information for determining the output method of the event information of the auxiliary display area 120, operation mode information for operating right hand mode or left hand mode, information for the completion of the output of the event information (e.g., a continuous output until a user interaction is inputted, or an output for a preset period of time, etc.), and information about the operation method of the sensor 330 for the silent alarm mode (e.g., a sensor to be used and an event condition for each sensor). The setting information 370 may be implemented as at least one mapping table.

The controller 390 controls a general operation of the portable terminal. The controller 390 may control operation related with the operation of the event information output based on the silent alarm mode for an alarm event using a flexible display unit 100 in an exemplary embodiment of the present invention. That is, in the flexible display unit 100, which is divided into the main display area 110 of the front surface and the auxiliary display area 120 of the side surface, the controller 390 may control the output of the event information of the alarm event using the auxiliary display area 120.

For example, the controller 390 may determine the state of the portable terminal based on the sensor 330 regardless of the generation of an alarm event, determine the entrance of the silent alarm mode according to the determined state of the portable terminal, and control the output of the event information of the alarm event based on the auxiliary display area 120 for the alarm event generated at the silent alarm mode. Further, the controller 390 may determine the state of the portable terminal at the time point when generation of an alarm event is detected, determine whether the portable terminal has entered the silent alarm mode according to the determined state of the portable terminal, control the output of the event information of the alarm event based on the auxiliary display area 120 when entering the silent alarm mode. Further, the controller 390 may operate the silent alarm mode based on the timer regardless of whether an alarm event has occurred. For example, the controller 390 may determine whether the portable terminal has entered the silent alarm mode by determining the current time of the portable terminal. For example, when the current time belongs to a predefined time range (e.g., midnight or a certain period of time), the entrance of the silent alarm mode may be determined. Further, the output of the event information of the alarm event may be controlled based on the auxiliary display area 120 for the alarm event which is generated at silent alarm mode.

Further, when outputting the event information on the auxiliary display area 120, the output method of the event information may be determined according to a priority, which is set for each alarm event, and a priority, which is set for each set of sending information, and the event information may be outputted according to the determined method. Further, the controller 390 may adaptively control the display direction of the event information of the auxiliary display area 120 according to the state of the portable terminal.

Further, the controller 390 may control various operations related with the general function of the portable terminal in addition to the function. For example, the controller 390 may control the operation and the screen display when executing a certain application. Further, the controller 390 may receive an input signal corresponding to various touch interaction inputs supported in the input interface based on a touch, and may control the function operation according thereto. Further, the controller 390 may control transmission and reception of various sets of data based on wired or wireless communication.

The portable terminal shown in FIG. 4 may be implemented on information communication device, multimedia device or application device which support the function according to one or more exemplary embodiments. For example, the portable terminal may include devices such as a mobile communication terminal operated according to each of communication protocols corresponding to various communication systems, a tablet personal computer, a smart phone, a digital camera, a portable multimedia player (PMP), a media player, a portable game console, and a personal digital assistant (PDA), etc.

Figure 5:
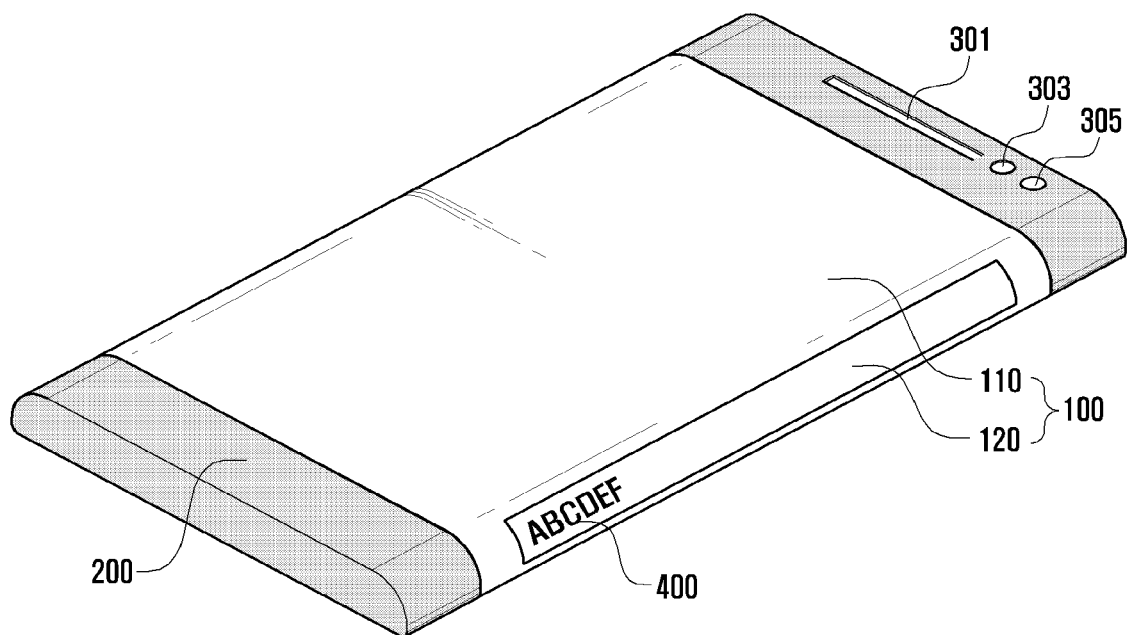
FIGS. 5, 6 and 7 illustrate an example of utilizing an auxiliary display area of the flexible display unit in a portable terminal according to an exemplary embodiment.
Figure 6:
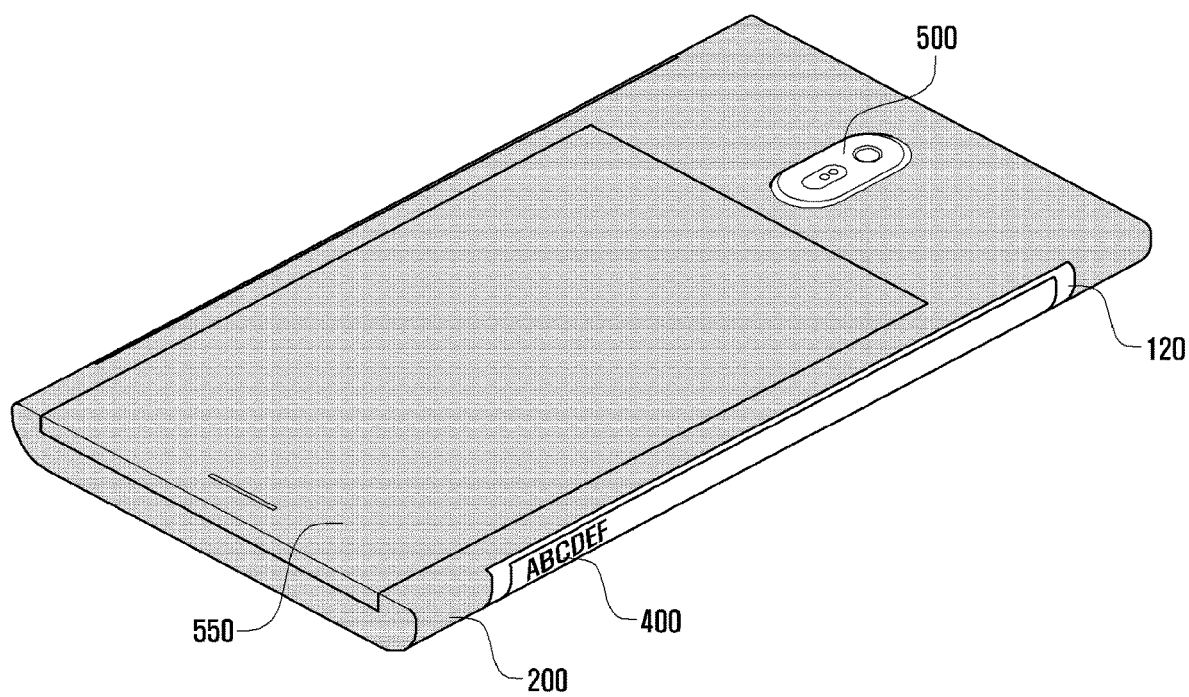
Figure 7:
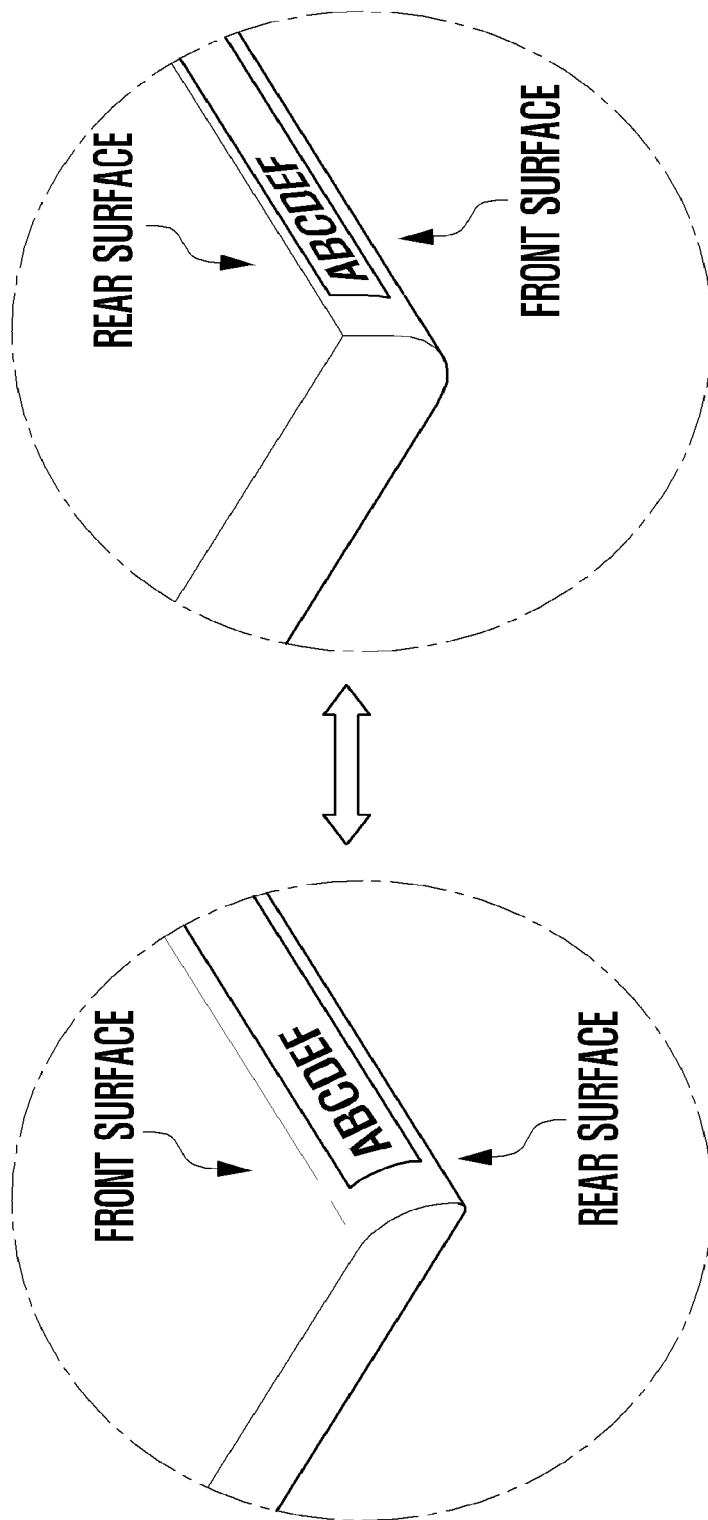

FIGS. 5 to 7 illustrate an example of using an auxiliary display area of the flexible display unit in a portable terminal according to an exemplary embodiment.

As illustrated in FIG. 5, a screen example is shown in which the front surface of the portable terminal is shown, and event information 400 is output in the auxiliary display area 120 of the flexible display unit 100. FIG. 6 illustrates a screen example where the rear surface of the portable terminal is shown, and the event information 400 is output on the auxiliary display area 120 of the flexible display unit in the state where the front surface of the portable terminal contacts the surface of the table, and FIG. 7 illustrates an operation of outputting event information 400 by adaptively converting (rotating) the display direction of the event information within the auxiliary display area 120 according to the state where the portable terminal is placed.

Referring to FIGS. 5 and 7, the display direction of the event information within the auxiliary display area 120 of the flexible display unit 100 may be the forward direction regardless of the state where the portable terminal is placed. For example, in the state where the front surface of the portable terminal is directed upward, in case the rear surface comes to be directed upward again, or in the state where the rear surface of the portable terminal is directed upward, in case the front surface comes to be directed upward again, the event information 400 may be rotated accordingly (e.g., 180 degrees) so that user may always see the event information in the auxiliary display area of portable terminal in the forward direction. Further, in case the portable terminal is placed diagonally at a preset angle (e.g., 30 degrees and 120 degrees, etc.) based on the state where the front surface of the portable terminal is directed upward, the rotational direction of the event information within the auxiliary display area 120 may be determined according to a preset angle as described above. For example, in case the preset angle is 30 degrees, the direction of the display of the event information within the auxiliary display area may correspond to the state where the front surface is directed upward, and in case the preset angle is 120 degrees, the direction of the display of the event information within the auxiliary display area 120 may correspond to the state where the rear surface is directed upward. Likewise, the rotation of the event information 400 according to the state where the portable terminal is placed may detect the state where the portable terminal is placed based on the acceleration sensor of the sensor 330 as described above, and the output method of the event information may be determined accordingly.

For example, when detecting an alarm event, the controller 390 may determine whether the portable terminal has entered the silent alarm mode based on the illumination sensor of the sensor 330. When it is determined that the portable terminal has entered the silent alarm mode, the state (position and direction) where the portable terminal is placed may be determined based on the acceleration sensor of the sensor. As shown in FIG. 5, the surface, where there are additional devices such as a speaker 301, an illumination sensor 303, a front surface camera module 350, and the main display area 120, is called the front surface, and as shown in FIG. 6, the surface, where there are a rear surface camera module 500 and a battery cover 550, etc., is called the rear surface.

In case the front surface of the portable terminal is directed upward as shown in FIG. 5, the event information 400 is directly outputted without rotation through the auxiliary display area 120, and in case the front surface directed downward as shown in FIG. 6, the event information 400 may be rotated by 180 degrees, and may be output through the auxiliary display area 120.

Further, in the state like an example as shown in FIG. 5 or FIG. 6, in case the state of the portable terminal is converted from one state to the opposite state, the display direction of the event information 400 of the auxiliary display area 120 may be adaptively rotated and displayed. At this time, while the event information 400 is outputted based on the auxiliary display area 120, when the position information, which indicates that the front surface and the rear surface of the portable terminal are turned upside down from the sensor 330, is detected, the controller 390 may control the conversion of the display direction of the event information 400.

The case of using the auxiliary display area 120 according to the state where the portable terminal is placed has been illustrated in FIGS. 5 to 7, but such an operation is possible even in case the portable terminal is contained in the case 800 of the portable terminal as shown in FIG. 3.

Figure 8:
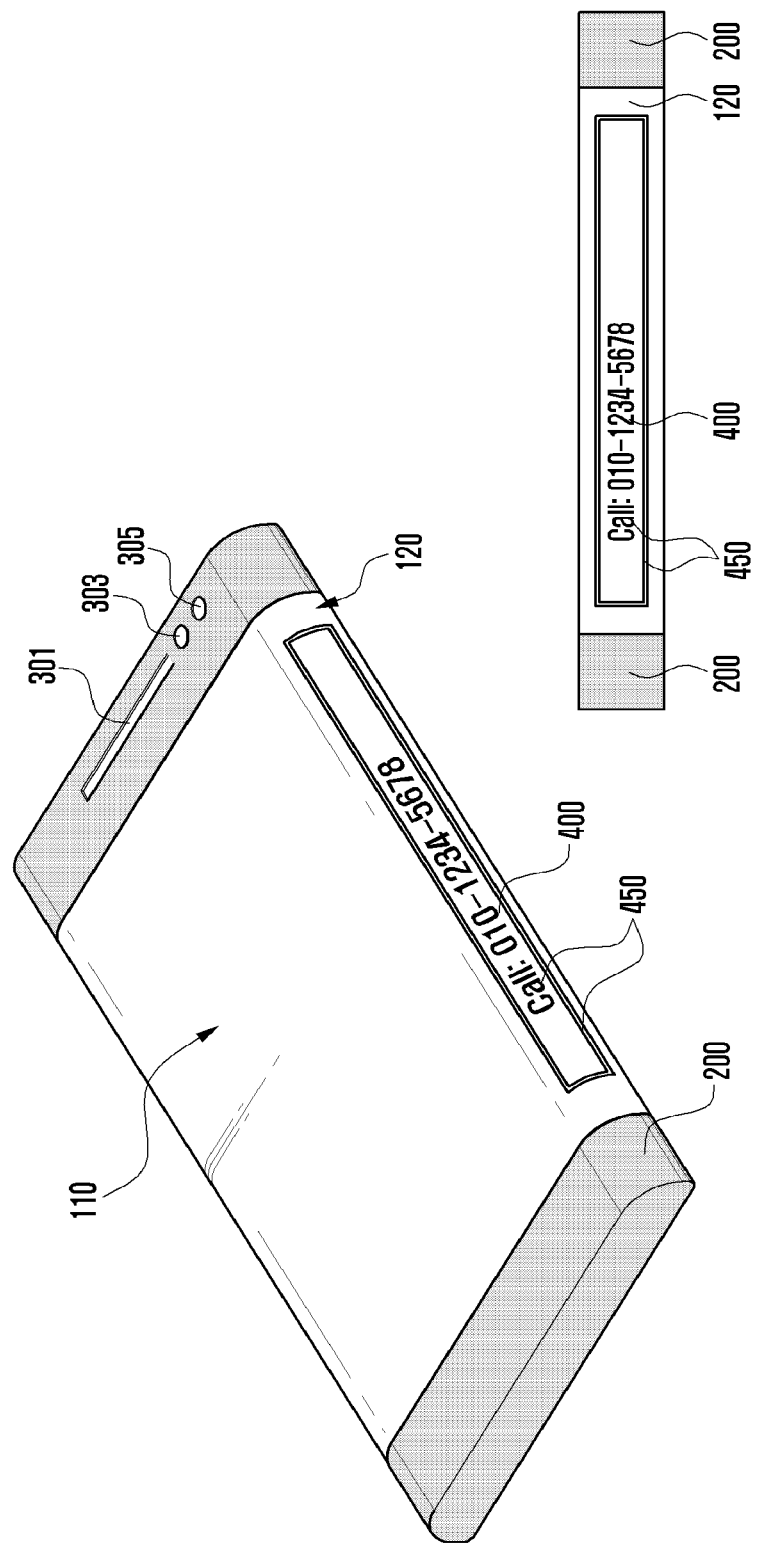
FIGS. 8, 9 and 10 illustrate an operation example of providing event information using an auxiliary display area according to an implemented type of the flexible display unit in a portable terminal according to an exemplary embodiment.
Figure 9:
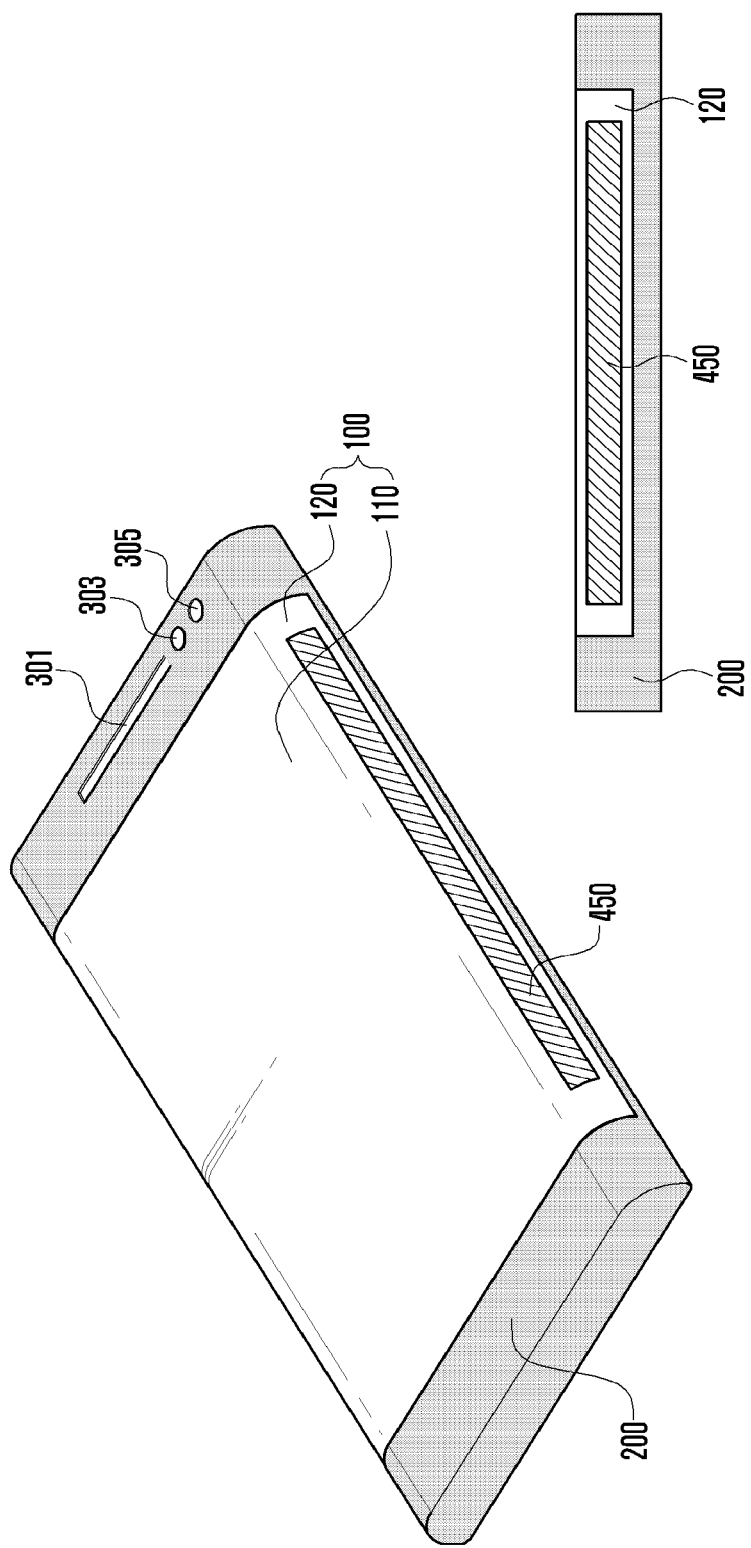
Figure 10:
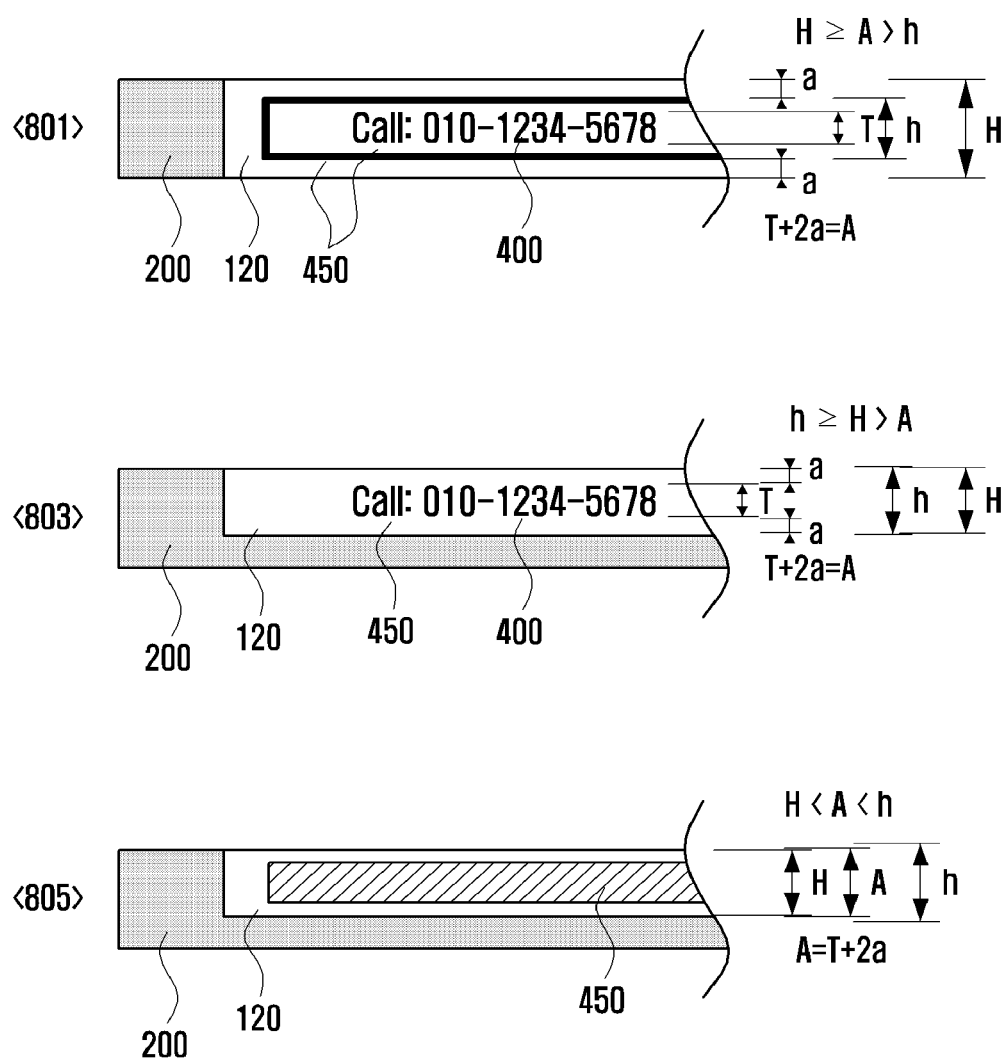

FIGS. 8 to 10 illustrate an operation example of providing event information using an auxiliary display area 120 according to an implemented type of the flexible display unit 100 in a portable terminal according to an exemplary embodiment.

Referring to FIGS. 8 to 10, FIG. 8 illustrates an example of a case where the auxiliary display area 120, which is extended to the side of the main body 200 of the portable terminal, is implemented to cover an entire end of the side of the main body 200, and FIG. 9 illustrates an example of a case where the auxiliary display area 120, which is extended to the side of the portable terminal, is implemented up to cover only a part of the side of the main body 200. FIG. 10 illustrates an example for explaining a method of outputting event information 400 according to the type in which the auxiliary display area 120 is implemented in the portable terminal.

As illustrated most clearly in FIG. 10, assuming that the height (the size of the vertical direction) of the auxiliary display area 120, which is extended to the side of the main body 200, is "H", the event information 400 may be differently processed according to the height H (the size of the vertical direction). For example, the event information 400 (e.g., sending information, message content, information of the push service, and the text such as an alarm of an SNS) and an event identifying item 450 (e.g., an icon for identifying an event type (a text-type icon and/or an image-type icon), a color border, and a color bar, etc.), which are extracted according to the height H of the auxiliary display area 120, may be selectively displayed.

As illustrated in FIG. 8, in case the height H of the auxiliary display area 120 is larger than or the same as the minimum display size A for displaying text (e.g., H=7 mm and A=6 mm), the event information 400 may be indicated by one or a combination of the text and the event identifying item 450. In contrast, as illustrated in FIG. 9, in case the height H of the auxiliary display area 120 is smaller than the minimum display size A for displaying text (e.g., H=6 mm and A=7 mm), the display of the text may be omitted, and the event information 400 may be displayed by one or a plurality of combinations of event identifying items 450. The minimum display size A may determined experimentally.

That is, according to an exemplary embodiment, the event information 400 and the event identifying item 450 may be selectively displayed according to the height H of the auxiliary display area 120.

As illustrated in FIG. 10, the auxiliary display area 120 may display event information 400 in consideration of the height H of the auxiliary display area 120, the minimum size h for displaying a color border implemented on the outer side of the text among event identifying items 450, and the minimum size A for displaying the text. Here, the minimum size A for displaying the text may be defined as the gap 2$a$ between the text size T and the auxiliary display area 120, i.e., "A=T+2$a$". The gap 2$a$ of the auxiliary display area 120 includes the upper gap $a$ and the lower gap $a$, and may be determined according to the radius of curvature of the flexible display unit 100. While the upper gap $a$ and the lower gap $a$ are shown as the same height in FIG. 10, the upper gap and the lower gap alternatively may be different heights. In FIG. 10, the lower gap among auxiliary display areas 120 may be omitted. For example, in case the auxiliary display area 120 is extended only part way into the side surface of the main body 200 of the portable terminal, the lower gap may be omitted, and in case the auxiliary display area 120 is extended to the bottom surface of the portable terminal, the lower gap may be generated according to the radius of curvature. In FIG. 10, the case where both the upper gap and the lower gap are included is illustrated for the convenience of explanation. In the case of the example of reference numeral 801, a case is illustrated in which the height H of the auxiliary display area 120 is larger than or the same as the minimum size A (A=T+2$a$) for displaying the text, and the minimum size A for displaying the text is larger than or the same as the minimum size h for displaying the color border. That is, an example of a case is illustrated in which the height H of the auxiliary display area 120 is larger than all other elements (e.g., H>=A>h), particularly when the height H of the auxiliary display area 120 is larger or the same as the minimum size A for displaying the text. In such a case, at least one of the event information 400 (e.g., a text of calling information, message content, information of a push service, and an SNS alarm, etc.) and the event identifying item 450 (e.g., an icon for identifying an event type (a text-type icon, and an image-type icon), a color border and a color bar, etc.) may be selectively displayed according to a setting of the portable terminal.

The example of reference numeral 803 shows a case where the height H of the auxiliary display area 120 is larger than or the same as the minimum size A (A=T+2$a$) for displaying the text, and is smaller than or the same as the minimum size h for displaying the color border. That is, the example shows the case where the height H of the auxiliary display area 120 contains all other sizes or is the size between the sizes (e.g., h≥H≥A), particularly the case where the height H of the auxiliary display area 120 is larger than or the same as the minimum display size, but is smaller than the minimum size h for displaying the color border. In this case, the event information 400 (e.g., a text of calling information, message content, information of a push service, and an SNS alarm, etc.) and part of the event identifying item 450 may be selectively displayed according to a setting of the portable terminal. Part of the event identifying item 450 may contain at least one of an icon for identifying an event type and a color bar except a color border.

The example of reference numeral 805 shows a case where the height H of the auxiliary display area 120 is smaller than the minimum size A (A=T+2a) for displaying a text, and the minimum size A for displaying the text is smaller than the minimum size h for displaying a color border. That is, the example shows a case where the height H of the auxiliary display area 120 has a smaller size (e.g., H<A<h) than all the other sizes, particularly the height H of the auxiliary display area 120 is smaller than the minimum size A for displaying a text. In such conditions, the display of the event information 400 (e.g., a text of calling information, message content, information of a push service, and an SNS alarm, etc.) is omitted in the auxiliary display area 120, and part of the event identifying item 450 may be selectively displayed. Part of the event identifying item 450 may include at least one of the icon for identifying the event type (e.g., an image type icon) and a color bar according to a setting of the portable terminal.

The above may be summarized as follows.

(1) In case the height H of the auxiliary display area 120 is larger than or the same as the minimum size A for displaying a text, at least one of the event information 400 and a part of the event identifying item 450 (particularly, at least one of an icon for identifying an event type and a color bar except a color border) may be displayed according to a setting of the portable terminal.

(2) In case the height H of the auxiliary display area 120 is a size between the minimum size A for displaying a text and the minimum size h for displaying a color border, at least one of the event information 400 and a part of the event identifying item 450 (particularly, at least one of an icon for identifying an event type and a color bar except a color border) may be displayed according to a setting of the portable terminal.

(3) In case the H of the auxiliary display area 120 is smaller than the minimum size A for displaying a text is, the event identifying item 450 (particularly, at least one of an icon for identifying an event type and a color bar according to a setting of the portable terminal) may be displayed.

For example, in the case of the above (1), as illustrated in reference numeral 801 of FIGS. 8 and 10, when an alarm event occurs, the type of the alarm event (e.g., a call, a message, an e-mail, a push service, or an SNS, etc.) may be determined, and the event information 400 (e.g., a text-based calling information, caller information, message content, push service alarm content, or SNS alarm content, etc.) may be extracted from the alarm event. Further, at least one of various event identifying items 450 (e.g., an icon for identifying an event type (a text-type icon and an image-type icon), a color border or a color bar, etc.) may be determined according to the type of the alarm event and the priority which is set thereto. Thereafter, the event information 400 and the event identifying item 450 may be displayed together. In the case of the above method (1), it is possible that only one of the event information 400 and the event identifying item 450 is selectively displayed according to a setting of the portable terminal.

In the case of the above method (2), as illustrated in reference numeral 803 of FIG. 10, when an alarm event occurs, an alarm event type (e.g., a call, a message, an e-mail, a push service, or an SNS, etc.) may be determined, and the event information 400 (e.g., a text-based calling information, caller information, message content, push service alarm content, or SNS alarm content, etc.) may be extracted from the alarm event. Further, at least one of various event identifying items 450 (e.g., an icon for identifying an event type (a text-type icon and an image-type icon), a color border or a color bar, etc.) may be determined according to the type of the alarm event and the priority which is set thereto. Thereafter, the event information 400 and the determined event identifying item 450 may be displayed together. In the case of the above method (2), it is possible that one of the event information 400 and the event identifying item 450 is selectively displayed according to a setting of the portable terminal.

In the case of the above method (3), as illustrated in FIG. 9 and reference numeral 805 of FIG. 10, when an alarm event occurs, an alarm event type (e.g., a call, a message, an e-mail, a push service, or an SNS, etc.) may be determined, and an event identifying item (particularly, an icon for identifying an event type (an image-type icon) or a color bar) mapped to the determined alarm event type may be extracted. Further, it is also possible that only the event identifying item 450 (e.g., a color bar) according to the priority of the alarm event type (or calling information) is extracted. Further, at least one extracted event identifying item 450 may be displayed.

Further, the height of the auxiliary display area 120, the minimum size A for displaying a text, the gap a of the auxiliary display area 120 and the size T for displaying the text, and the minimum size h for displaying the color border may be respectively defined. For example, the sizes of the portable terminal may be respectively defined according to the type of portable terminal in which the flexible display unit 100 is implemented.

Hereinafter, an example of a specific operation that outputs event information of an alarm event using the auxiliary display area 120 will be described with reference to FIG. 11.

Figure 11:
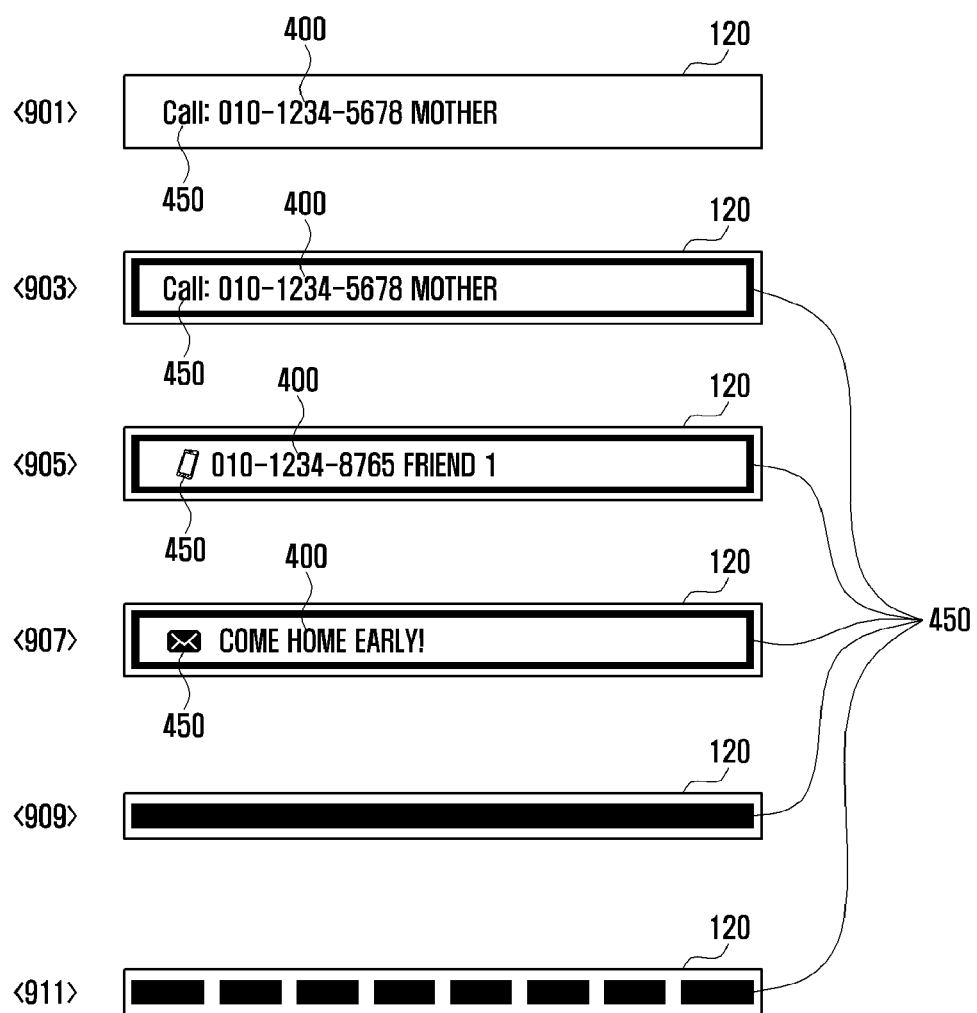
FIG. 11 illustrates an example of event information output in an auxiliary display area of a flexible display unit according to an exemplary embodiment.

FIG. 11 illustrates event information outputted in the auxiliary display area 120 of the flexible display unit 100 according to an exemplary embodiment.

Referring to FIG. 11, with respect to event information about an alarm event, at least one of a text and an event identifying item may be displayed through the auxiliary display area 120. At this time, the event information output through the auxiliary display area 120 may be displayed by one of a text or an event identifying item, or a combination thereof according to the height of the auxiliary display area 120 as considered above. Further, the event information output through the auxiliary display area 120 may be provided in various combinations according to a setting of the portable terminal.

For example, as illustrated in reference numeral 901, a received alarm event is a call reception, and a text-type icon for identifying the type of the alarm event like "Call:" among the event identifying items 450, and event information 400 like "010-1234-5678 Mother" may be provided together through the auxiliary display area 120.

As illustrated in reference numeral 903, the received alarm event is a call reception, and among event identifying items 450, a text-type icon for identifying the type of the alarm event like "Call:", event information 400 like "010-1234-5678 Mother", and a color border for alarming the priority which is set for the alarm event by being formed in a certain form (e.g., a square form and an elliptic form, etc.) which surrounds the outer block of the text-type icon and the event information, may be provided together through the auxiliary display area 120. The color border may be provided in a color, which is distinguished according to each priority, such as red, yellow and blue, etc. according to the priority (important, common and bookmark, etc.) according to a setting of the portable terminal. For example, assuming the case a high priority is set for a calling number of "010-1234-5678" according to importance in reference numeral 903, the color border based on the red color may be provided. In case there is no priority setting for the generated alarm event, the screen may be provided without a separate border as shown in reference numeral 901, or the border of a certain color (e.g., a black color) may be provided.

As illustrated in reference numeral 905, the received alarm event may be a call reception, and among event identifying items 450, an image-type icon for identifying the type of the alarm event like "$\Box$", event information 400 like "010-1234-5678 Friend 1", and a color border for alarming the priority which is set for the alarm event by being formed in a certain form (e.g., a square form and an elliptic form, etc.) which surrounds the outer block of the image-type icon and the event information 400, may be provided together through the auxiliary display area 120. The color border may be provided in a color, which is distinguished according to each priority, such as red, yellow and blue, etc. according to the priority (important, common and bookmark, etc.) according to a setting of the portable terminal. For example, assuming the case a high priority is set for a calling number of "010-1234-5678" according to the bookmark in reference numeral 905, the color border based on the blue color may be provided.

As illustrated in reference numeral 907, the received alarm event is a message reception, and among event identifying items 450, an image-type icon for identifying the type of the alarm event like "$\boxtimes$", event information 400 like "Come home early!!", and a color border for alarming the priority which is set for the alarm event by being formed in a certain form (e.g., a square form and an elliptic form, etc.) which surrounds the outer block of the image-type icon and the event information 400, may be provided together through the auxiliary display area 120. The color border may be provided in a color, which is distinguished according to each priority, such as red, yellow and blue, etc. according to the priority (important, common and bookmark, etc.) according to a setting of the portable terminal. For example, assuming the case a high priority is set for a message according to the common order in reference numeral 907, the color border based on the yellow color may be provided. In case there is no priority setting for the generated alarm event as in a spam message, the screen may be provided without a separate border item as shown in reference numeral 901, or the border of a preset certain color (e.g., a black color) may be provided according to a setting of the portable terminal.

In the case of reference numerals 909 and 911, the height of the auxiliary display area 120 may be smaller than the minimum text display size, or a color bar may be provided according to a setting of the portable terminal. As illustrated in reference numerals 909 and 911, different types of color bars may be displayed according to the received alarm event, and color bars of different colors may be displayed according to the priority which is set for the received alarm event. For example, in the case of the alarm event of a call reception, a straight line bar type may be used as shown in reference numeral 909, and the bar may be displayed in a color corresponding to the preset priority. Further, in the case of an alarm event of a message reception, a bar type of a dotted line may be used as shown in reference numeral 911, and the bar may be displayed in a color corresponding to the preset priority. Further, various types may be provided in addition to reference numerals 909 and 911 according to a setting of the portable terminal. For example, an image-type icon and a color bar may be provided in a combined form, or a received alarm event may be constituted to be displayed on the entire area or partial area of the auxiliary display area 120 according to the importance or conditions according to a setting of the portable terminal.

Figure 12:
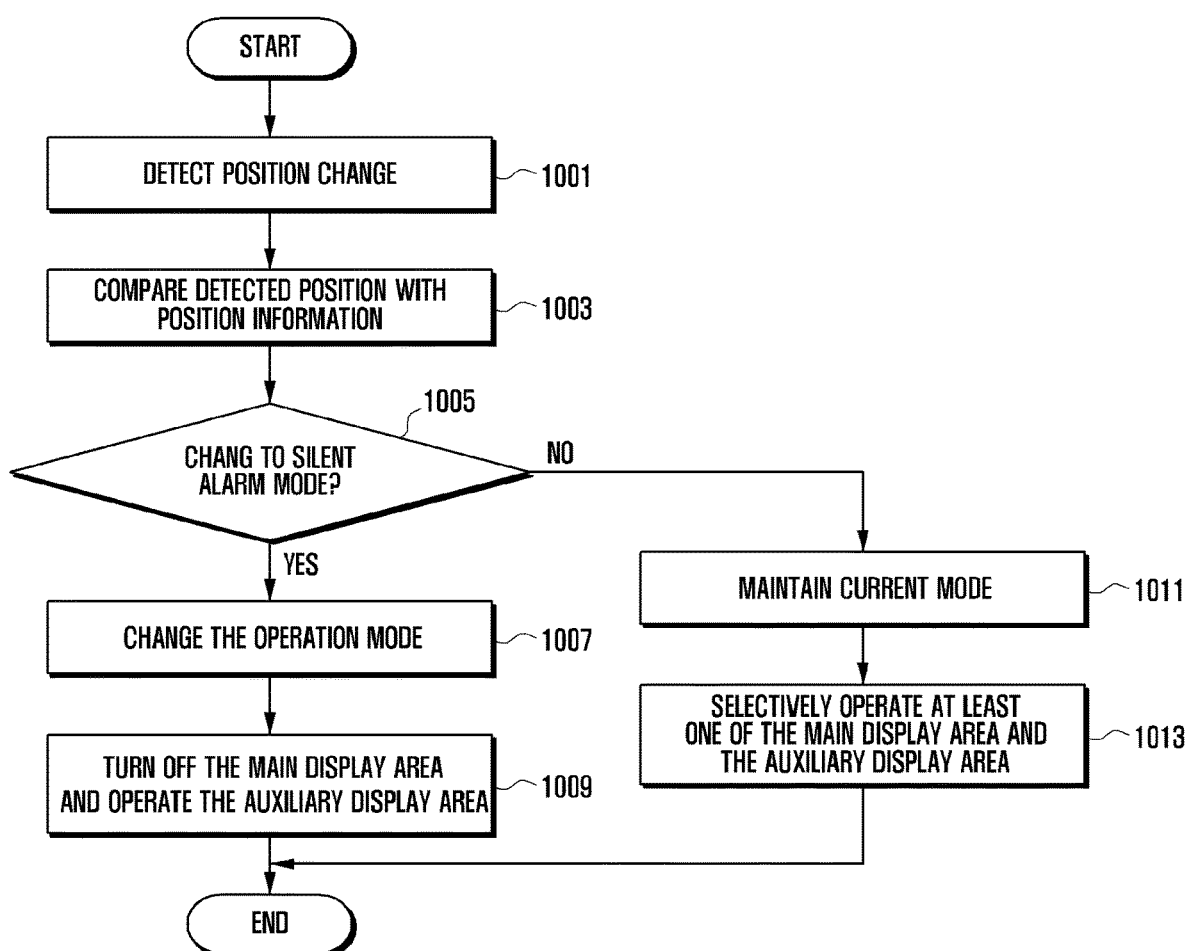
FIG. 12 is a flowchart illustrating an example of operating a flexible display unit for a state change of a portable terminal according to an exemplary embodiment.

FIG. 12 is a flowchart illustrating an operation example of a flexible display unit 100 for the state change of a portable terminal according to an exemplary embodiment.

Referring to FIG. 12, FIG. 12 may correspond to a case where silent alarm mode is predefined by user. For example, when a user participates in a meeting, etc., the user may set the environment of the portable terminal to the predefined state for silent alarm mode. For example, user may put the portable terminal so that the front surface of the portable terminal contacts the surface of a table like a desk. Further, user may put the portable terminal so that the front surface is directed upward, and the main display area 110 is covered by the case 800 of the portable terminal. Here, at least one sensor 330 such as an illumination sensor or an acceleration sensor may be operating for changing to silent alarm mode, or a sensor 330 may be operated by a manual operation of user.

As illustrated in FIG. 12, the controller 390 may detect a position change (or illumination change) of the portable terminal as considered above (1001). For example, the user may place the portable terminal on the surface like a desk. Then the controller 330 may detect the change of the position (or illumination change) of the portable terminal based on the measured value obtained from a sensor 330 like an illumination sensor or acceleration sensor.

When detecting the position change (illumination change) of the portable terminal, the controller 390 may compare the change with preset position information (or illumination information) (1003). The comparison may correspond to an operation for determining whether the detected position change (or illumination change) satisfies conditions for entering a silent alarm mode.

The controller 390 may determine whether the state change of the portable terminal is for changing into silent alarm mode by comparison of the position information (or illumination information) (1005). For example, if the position information (or illumination information) corresponds to predefined setting information, changing into silent alarm mode is determined, and if the information does not correspond to predefined setting information, processing according general mode is determined.

If change into silent alarm mode is determined (Yes in operation 1005), the controller 390 may change the current operation mode into silent alarm mode (1007). Further, when changing into silent alarm mode, the controller 390 may turn off the main display area 110 and operate the flexible display unit 100 based on the auxiliary display area 120 (1009).

If it is determined that the state change is not for changing into silent alarm mode (No in operation 1005), the current operation mode of the portable terminal is maintained (1011). If the current operation mode of the portable terminal corresponds to silent alarm mode, the controller 390 may convert the operation mode into general mode (1007). Further, the controller 390 may control operation of a flexible display unit 100 by selection of at least one of the main display area 110 and the auxiliary display area 120 (1013).

Figure 13:
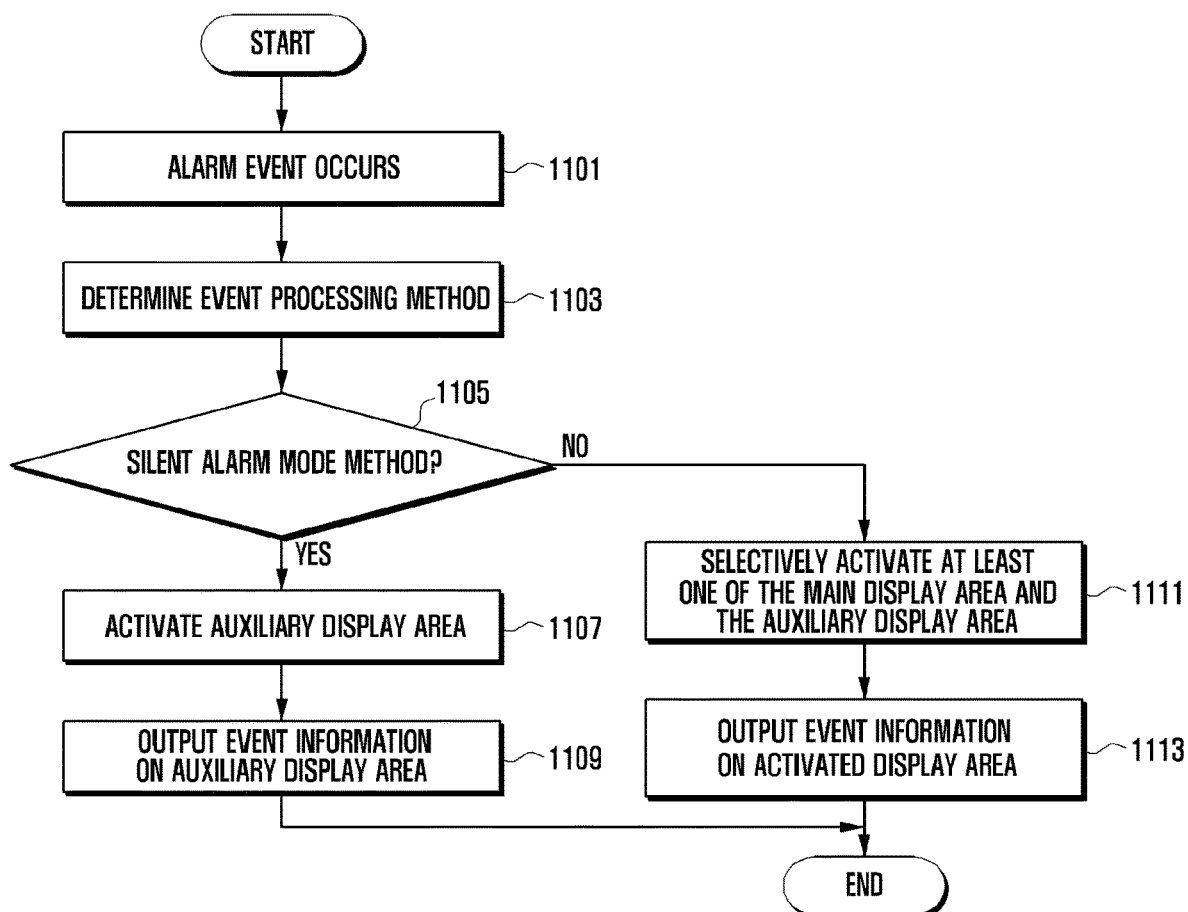
FIG. 13 is a flowchart illustrating an example of operating a flexible display unit for an alarm event in a portable terminal according to an exemplary embodiment.

FIG. 13 is a flowchart illustrating an operation example of a flexible display area 100 for an alarm event in a portable terminal according to an exemplary embodiment.

FIG. 13 illustrates an example of confirming the state (illumination and position, etc.) of the portable terminal when an alarm event occurs from the outside, and processing operation by silent alarm mode and operation by general mode according to the state of the portable terminal. Further, in FIG. 13, a sensor 330 for determining the state of the portable terminal for changing into silent alarm mode may be operated at the time of occurrence of an alarm event.

As illustrated in FIG. 13, the controller 390 may detect an occurrence of an alarm event among various alarm events as considered above (1101). For example, the controller 390 may detect the occurrence of an alarm event according to a call reception, a message reception, an information reception of a push service, an e-mail reception, or an information reception of an SNS, etc.

The controller 390 may determine an event processing method according to the alarm event when detecting occurrence of the alarm event (1103 and 1105). For example, the controller 390 may check the state of the portable terminal through the sensor 330 as considered above, and determine one of event processing by silent alarm mode or event processing by general mode according to the state of the portable terminal. That is, the controller 390 may determine whether to operate the silent alarm mode by states of the portable terminal when an alarm event occurs. Further, when an alarm event occurs, the controller 390 may determine whether to enter the silent alarm mode by determining the current time of the portable terminal. For example, the controller 390 may determine whether to operate the silent alarm mode of the portable terminal by determining whether the current time belongs to a predetermine time (e.g., midnight or a certain time period).

If the state of the portable terminal is determined as an event processing by silent alarm mode (Yes in operation 1105), the auxiliary display area 120 is activated (1107), and the event information is controlled to be output on the auxiliary display area 120 (1109). Here, when an alarm event occurs, the state of the portable terminal is first determined by an illumination sensor or acceleration sensor of the sensor 330, and it is determined whether to enter the silent alarm mode according to the state of the portable terminal. Further, when entering the silent alarm mode, the position of the portable terminal is checked secondarily by the acceleration sensor of the sensor 330, and the direction of the display of the event information is determined according to the position of the portable terminal.

If the state of the portable terminal is determined as an event processing by general mode (No in operation 1105), at least one of the main display area 110 and the auxiliary display area 120 may be selectively activated (1111). Further, the controller 390 may output event information on the activated display area (1113).

Figure 14:
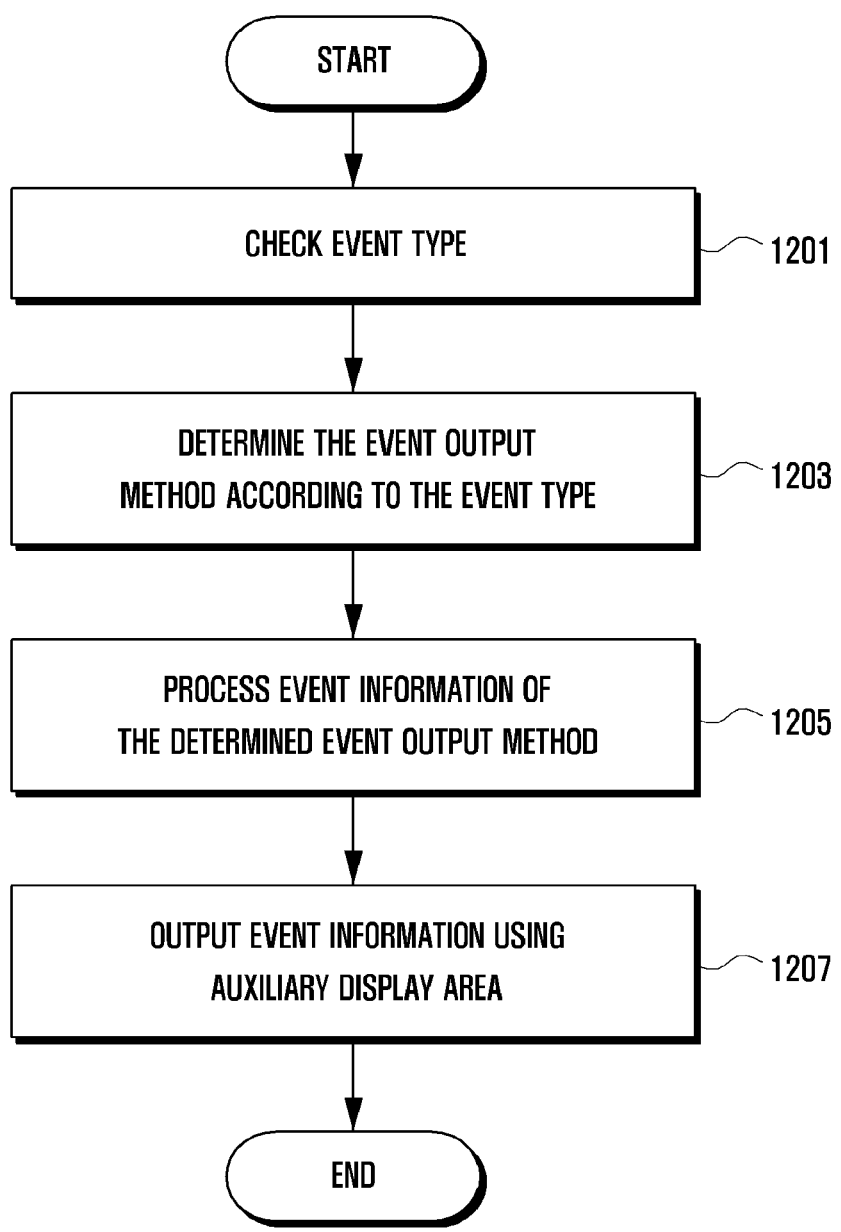
FIG. 14 is a flowchart illustrating an example of operating a flexible display unit for event information in a portable terminal according to an exemplary embodiment.

FIG. 14 is a flowchart illustrating an example of an operation of a flexible display unit 100 for event information in a portable terminal according to an exemplary embodiment.

FIG. 14 illustrates an example of determining an output method of event information for an alarm event while the silent alarm mode is operated, and processing an output of event information according to the determined output method.

As illustrated in FIG. 14, as considered above, the controller 390 may determine an event type according to the alarm event when processing the generated alarm event by silent alarm mode (1201). For example, the controller 390 may determine the type to which the alarm event belongs, among various event types such as a call reception, a message reception, an information reception of a push service, an e-mail reception or an information reception of an SNS, etc. The event type may be identified by checking the header of the transmitted data according to the event.

When determining the event type, the controller 390 may determine the event output (alarm) method according to the determined event type (1203). For example, as described with reference to FIG. 11, the controller 390 may determine an event identifying icon (e.g., a text-type icon and an image-type icon, etc.) corresponding to the event type, an output by one or combination of event information and an event identifying item, and/or whether to apply colors by priorities for event identifying items, etc.

When the event output method is determined, the controller 390 may process event information according to the determined event output method (1205). For example, the controller 390 may process event information by combining the information with the event identifying item according to the determined event output method so that the information may be output in the form of one of the methods described in the description with reference to reference numerals 901 to 911 of FIG. 11.

The controller 390 may output processed event information using the auxiliary display area 120 (1207). The controller 390 may determine whether to rotate the event information to be displayed on the auxiliary display area 120 by checking the position of the portable terminal, and if it is determined that the event information should be rotated, the controller 390 may rotate the event information by 180 degrees, and provide the rotated event information to the auxiliary display area 120.

The foregoing method for providing an event of portable device having a flexible display unit may be implemented in an executable program command form by various computer means and be recorded in a computer readable recording medium. In this case, the computer readable recording medium may include a program command, a data file, and a data structure individually or a combination thereof. The program commands recorded in a recording medium may be specially designed or configured or be known to a person having ordinary skill in a computer software field. The computer readable recording medium may include Magnetic Media such as hard disk, floppy disk, or magnetic tape, Optical Media such as Compact Disc Read Only Memory (CD-ROM) or Digital Versatile Disc (DVD), Magneto-Optical Media such as floptical disk, and a hardware device such as ROM. RAM, flash memory storing and executing program commands. Further, the program commands may include a machine language code created by a complier and a high-level language code executable by a computer using an interpreter. The foregoing hardware device may be configured to be operated as at least one software module to perform an operation as described above, and vice versa.

As described above, according to a method and apparatus for providing an event of a portable terminal having a flexible display unit described above, as a flexible display unit, whose two ends are bent, is extended to the side of the portable terminal, the display area may be easily extended. Further, the flexible display unit may be divided into the main display area of the front and the auxiliary display area of the side, and an alarm event may be supported using the auxiliary display area. As such, even in a situation when user cannot use the main display area of the front, it is possible to more intuitively check event information based on the auxiliary display area.

According to exemplary embodiments, when an alarm event occurs, the state of the portable terminal is checked, and it is possible to process an event information output of the occurred alarm event at the mode corresponding to the checked state. For example, if the state of the portable terminal corresponds to various situations where the main display area of the flexible display unit is not used, i.e., silent alarm mode, event information according to the alarm event is outputted using the auxiliary display area of the flexible display unit, and if the state of the portable terminal corresponds to a situation where the main display area is used, i.e., general mode, event information according to the alarm event may be output through at least one display area based on a setting of the portable terminal among the main display area and the auxiliary display area. As such, various responses to an alarm event such as a call reception, a message reception, a push service reception and/or an SNS alarm reception, etc. are possible, thereby improving user convenience. Further, the present inventive concept may be implemented in all types of portable terminals and various devices corresponding thereto. Further, optimal environments for an output of event information by states of the portable terminal may be implemented, thereby improving usability, convenience and competitiveness of the portable terminal.

Although exemplary embodiments have been described in detail hereinabove, it should be clearly understood that many variations and modifications of the basic inventive concepts herein taught which may appear to those skilled in the present art will still fall within the spirit and scope of the present inventive concept, as defined in the appended claims.

What is claimed is:

1. An electronic apparatus, comprising:
   a main body;
   a single display which is mounted on the main body, the single display comprising:
      a main display area, and
      an auxiliary display area which is extended from the main display area to a rear surface of the electronic apparatus and is smaller than the main display area,
   wherein the auxiliary display area comprises a curvature extending from the main display area,
   wherein the main body comprises:
      a front portion which is coupled with the main display area, the front portion and the main display area form a front surface of the electronic apparatus,
      a rear portion which forms the rear surface of the electronic apparatus, and
      a side portion which is coupled with the auxiliary display area, the side portion and the auxiliary display area form at least one side surface of the electronic apparatus, and
   wherein the side portion comprises a curved area corresponding the curvature.

2. The electronic apparatus of claim 1, wherein the auxiliary display area comprises:
   a first auxiliary display area which is extended from a first side of the main display area to form a first side surface of the electronic apparatus and is smaller than the main display area, and
   a second auxiliary display area which is extended from a second side of the main display area to form a second side surface of the electronic apparatus and is smaller than the main display area.

3. The electronic apparatus of claim 1, further comprising:
   an illumination sensor which is disposed on the front surface of the electronic apparatus.

4. The electronic apparatus of claim 1, further comprising:
   a first camera module which is disposed on the front surface of the electronic apparatus.

5. The electronic apparatus of claim 4, further comprising:
   a second camera module which is disposed on the rear surface of the electronic apparatus.

6. The electronic apparatus of claim 1, wherein the main display area is flat.

7. The electronic apparatus of claim 1, wherein the single display further comprises:
   a touch panel which receives a touch input on one of the main display area and the auxiliary display area.

* * * * *